(12) United States Patent
Achanta et al.

(10) Patent No.: US 8,775,299 B2
(45) Date of Patent: Jul. 8, 2014

(54) SYSTEMS AND METHODS FOR LARGE-SCALE CREDIT DATA PROCESSING

(75) Inventors: Venkat Achanta, Richmond, VA (US); Karthikeyan Reddy Aaravabhoomi, Irvine, CA (US); Patricia Cheryl Lassen, Orange, CA (US); Timothy Sumida, Yorba Linda, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 0 days.

(21) Appl. No.: 13/546,965

(22) Filed: Jul. 11, 2012

(65) Prior Publication Data

US 2013/0124392 A1 May 16, 2013

Related U.S. Application Data

(60) Provisional application No. 61/507,092, filed on Jul. 12, 2011.

(51) Int. Cl.
*G06Q 40/00* (2012.01)

(52) U.S. Cl.
USPC .............................................. 705/38; 705/35

(58) Field of Classification Search
CPC ....................................................... G06Q 99/00
USPC ......................................................... 705/35
See application file for complete search history.

(56) References Cited

U.S. PATENT DOCUMENTS

| | | | |
|---|---|---|---|
| 4,827,508 A | 5/1989 | Shear | |
| 4,868,570 A | 9/1989 | Davis | |
| 4,935,870 A | 6/1990 | Burk, Jr. et al. | |
| 5,216,612 A | 6/1993 | Cornett et al. | |
| 5,247,575 A | 9/1993 | Sprague et al. | |
| 5,325,509 A | 6/1994 | Lautzenheiser | |
| 5,341,429 A | 8/1994 | Stringer et al. | |
| 5,528,701 A | 6/1996 | Aref | |
| 5,555,409 A | 9/1996 | Leenstra, Sr. et al. | |
| 5,590,038 A | 12/1996 | Pitroda | |
| 5,621,201 A | 4/1997 | Langhans et al. | |
| 5,630,070 A | 5/1997 | Dietrich et al. | |
| 5,640,551 A | 6/1997 | Chu et al. | |
| 5,640,577 A | 6/1997 | Scharmer | |
| 5,655,129 A | 8/1997 | Ito | |

(Continued)

FOREIGN PATENT DOCUMENTS

| | | |
|---|---|---|
| EP | 0 419 889 | 4/1991 |
| EP | 0 458 698 | 11/1991 |

(Continued)

OTHER PUBLICATIONS

U.S. Appl. No. 12/705,489, filed Feb. 12, 2010, Bargoli et al.

(Continued)

*Primary Examiner* — William Rankins
(74) *Attorney, Agent, or Firm* — Knobbe, Martens, Olson & Bear, LLP

(57) ABSTRACT

Systems and methods are provided for processing large volumes of credit-related data and other data, and generating products based on the processed data. Data received from a number of different data sources may be processed in parallel and stored in memory. Reporting rules may be defined in association with each of a number of different accounts. Products, such as credit reports, may then be generated based on one or more rule sets.

12 Claims, 20 Drawing Sheets

(56) References Cited

U.S. PATENT DOCUMENTS

| | | |
|---|---|---|
| 5,659,731 A | 8/1997 | Gustafson |
| 5,666,528 A | 9/1997 | Thai |
| 5,737,732 A | 4/1998 | Gibson et al. |
| 5,765,143 A | 6/1998 | Sheldon et al. |
| 5,768,423 A | 6/1998 | Aref et al. |
| 5,774,692 A | 6/1998 | Boyer et al. |
| 5,778,405 A | 7/1998 | Ogawa |
| 5,797,136 A | 8/1998 | Boyer et al. |
| 5,812,840 A | 9/1998 | Shwartz |
| 5,822,750 A | 10/1998 | Jou et al. |
| 5,822,751 A | 10/1998 | Gray et al. |
| 5,825,884 A | 10/1998 | Zdepski et al. |
| 5,832,068 A | 11/1998 | Smith |
| 5,835,915 A | 11/1998 | Carr et al. |
| 5,844,218 A | 12/1998 | Kawan et al. |
| 5,881,131 A | 3/1999 | Farris et al. |
| 5,893,090 A | 4/1999 | Friedman et al. |
| 5,903,830 A | 5/1999 | Joao et al. |
| 5,905,985 A | 5/1999 | Malloy et al. |
| 5,956,693 A | 9/1999 | Geerlings |
| 5,963,932 A | 10/1999 | Jakobsson et al. |
| 5,999,596 A | 12/1999 | Walker et al. |
| 6,038,551 A | 3/2000 | Barlow et al. |
| 6,073,140 A | 6/2000 | Morgan et al. |
| 6,121,901 A | 9/2000 | Welch et al. |
| 6,128,602 A | 10/2000 | Northington et al. |
| 6,128,624 A | 10/2000 | Papierniak et al. |
| 6,144,957 A | 11/2000 | Cohen et al. |
| 6,151,601 A | 11/2000 | Papierniak et al. |
| 6,223,171 B1 | 4/2001 | Chaudhuri et al. |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,304,869 B1 | 10/2001 | Moore et al. |
| 6,311,169 B2 | 10/2001 | Duhon |
| 6,339,769 B1 | 1/2002 | Cochrane et al. |
| 6,366,903 B1 | 4/2002 | Agrawal et al. |
| 6,496,819 B1 | 12/2002 | Bello et al. |
| 6,505,168 B1 | 1/2003 | Rothman et al. |
| 6,523,022 B1 | 2/2003 | Hobbs |
| 6,523,041 B1 | 2/2003 | Morgan et al. |
| 6,574,623 B1 | 6/2003 | Leung et al. |
| 6,651,220 B1 | 11/2003 | Penteroudakis et al. |
| 6,658,393 B1 | 12/2003 | Basch et al. |
| 6,738,748 B2 | 5/2004 | Wetzer |
| 6,766,327 B2 | 7/2004 | Morgan, Jr. et al. |
| 6,804,346 B1 | 10/2004 | Mewhinney |
| 6,804,701 B2 | 10/2004 | Muret et al. |
| 6,850,895 B2 | 2/2005 | Brodersen et al. |
| 6,910,624 B1 | 6/2005 | Natsuno |
| 6,934,714 B2 | 8/2005 | Meinig |
| 6,985,887 B1 | 1/2006 | Sunstein et al. |
| 7,003,504 B1 | 2/2006 | Angus et al. |
| 7,028,052 B2 | 4/2006 | Chapman et al. |
| 7,050,989 B1 | 5/2006 | Hurt et al. |
| 7,082,435 B1 | 7/2006 | Guzman et al. |
| 7,133,935 B2 | 11/2006 | Hedy |
| 7,185,016 B1 | 2/2007 | Rasmussen |
| 7,200,602 B2 | 4/2007 | Jonas |
| 7,240,059 B2 | 7/2007 | Bayliss et al. |
| 7,277,900 B1 | 10/2007 | Ganesh et al. |
| 7,367,011 B2 | 4/2008 | Ramsey et al. |
| 7,370,044 B2 | 5/2008 | Mulhern et al. |
| 7,376,603 B1 | 5/2008 | Mayr et al. |
| 7,383,215 B1 | 6/2008 | Navarro et al. |
| 7,403,942 B1 | 7/2008 | Bayliss |
| 7,451,113 B1 | 11/2008 | Kasower |
| 7,467,127 B1 | 12/2008 | Baccash et al. |
| 7,475,118 B2 | 1/2009 | Leiba et al. |
| 7,483,842 B1 | 1/2009 | Fung et al. |
| 7,529,698 B2 | 5/2009 | Joao |
| 7,536,346 B2 | 5/2009 | Aliffi et al. |
| 7,542,993 B2 | 6/2009 | Satterfield et al. |
| 7,584,146 B1 | 9/2009 | Duhon |
| 7,596,716 B2 | 9/2009 | Frost et al. |
| 7,668,840 B2 | 2/2010 | Bayliss et al. |
| 7,689,505 B2 | 3/2010 | Kasower |
| 7,690,032 B1 | 3/2010 | Peirce |
| 7,698,163 B2 | 4/2010 | Reed et al. |
| 7,707,059 B2 | 4/2010 | Reed et al. |
| 7,747,480 B1 | 6/2010 | Agresta et al. |
| 7,774,270 B1 | 8/2010 | MacCloskey |
| 7,836,111 B1 | 11/2010 | Shan |
| 7,853,493 B2 | 12/2010 | DeBie et al. |
| 7,983,932 B2 | 7/2011 | Kane |
| 7,991,689 B1 | 8/2011 | Brunzell et al. |
| 8,001,042 B1 | 8/2011 | Brunzell et al. |
| 8,127,986 B1 | 3/2012 | Taylor et al. |
| 8,195,549 B2 | 6/2012 | Kasower |
| 8,234,498 B2 | 7/2012 | Britti et al. |
| 8,355,967 B2 | 1/2013 | Debie et al. |
| 8,515,844 B2 | 8/2013 | Kasower |
| 2001/0011245 A1* | 8/2001 | Duhon ............................ 705/38 |
| 2001/0029482 A1 | 10/2001 | Tealdi et al. |
| 2001/0037332 A1 | 11/2001 | Miller et al. |
| 2002/0049738 A1 | 4/2002 | Epstein |
| 2002/0077964 A1 | 6/2002 | Brody et al. |
| 2002/0099635 A1 | 7/2002 | Guiragosian |
| 2002/0099824 A1 | 7/2002 | Bender et al. |
| 2002/0107957 A1 | 8/2002 | Zargham et al. |
| 2002/0128962 A1 | 9/2002 | Kasower |
| 2002/0138297 A1 | 9/2002 | Lee |
| 2002/0165757 A1 | 11/2002 | Lisser |
| 2002/0169747 A1 | 11/2002 | Chapman et al. |
| 2002/0173984 A1 | 11/2002 | Robertson et al. |
| 2002/0184255 A1 | 12/2002 | Edd et al. |
| 2003/0009418 A1 | 1/2003 | Green et al. |
| 2003/0018549 A1 | 1/2003 | Fei et al. |
| 2003/0050882 A1 | 3/2003 | Degen et al. |
| 2003/0097380 A1 | 5/2003 | Mulhern et al. |
| 2003/0171942 A1 | 9/2003 | Gaito |
| 2003/0191731 A1 | 10/2003 | Stewart et al. |
| 2003/0212654 A1 | 11/2003 | Harper et al. |
| 2003/0229892 A1 | 12/2003 | Sardera |
| 2004/0030649 A1 | 2/2004 | Nelson et al. |
| 2004/0078323 A1 | 4/2004 | Johnston et al. |
| 2004/0098625 A1 | 5/2004 | Lagadec et al. |
| 2004/0103147 A1 | 5/2004 | Flesher et al. |
| 2004/0128150 A1 | 7/2004 | Lundegren |
| 2004/0153448 A1 | 8/2004 | Cheng et al. |
| 2004/0199789 A1 | 10/2004 | Shaw et al. |
| 2004/0220896 A1 | 11/2004 | Finlay et al. |
| 2004/0225596 A1 | 11/2004 | Kemper et al. |
| 2004/0230534 A1 | 11/2004 | McGough |
| 2004/0243588 A1 | 12/2004 | Tanner et al. |
| 2005/0010513 A1 | 1/2005 | Duckworth et al. |
| 2005/0137899 A1 | 6/2005 | Davies et al. |
| 2005/0154664 A1 | 7/2005 | Guy et al. |
| 2005/0192008 A1 | 9/2005 | Desai et al. |
| 2005/0262158 A1 | 11/2005 | Sauermann |
| 2005/0279827 A1 | 12/2005 | Mascavage et al. |
| 2006/0020611 A1 | 1/2006 | Gilbert et al. |
| 2006/0036543 A1 | 2/2006 | Blagg et al. |
| 2006/0074991 A1 | 4/2006 | Lussier et al. |
| 2006/0149674 A1 | 7/2006 | Cook et al. |
| 2007/0220611 A1 | 9/2007 | Socolow et al. |
| 2007/0226093 A1 | 9/2007 | Chan et al. |
| 2007/0282730 A1 | 12/2007 | Carpenter et al. |
| 2008/0059224 A1 | 3/2008 | Schechter |
| 2008/0059449 A1 | 3/2008 | Webster et al. |
| 2008/0184270 A1* | 7/2008 | Cole et al. ..................... 719/318 |
| 2008/0301016 A1 | 12/2008 | Durvasula et al. |
| 2009/0018996 A1 | 1/2009 | Hunt et al. |
| 2009/0024428 A1 | 1/2009 | Hudock, Jr. |
| 2009/0060343 A1 | 3/2009 | Rosca |
| 2009/0112650 A1 | 4/2009 | Iwane |
| 2009/0126013 A1 | 5/2009 | Atwood et al. |
| 2009/0254971 A1 | 10/2009 | Herz et al. |
| 2009/0271248 A1 | 10/2009 | Sherman et al. |
| 2010/0030677 A1 | 2/2010 | Melik-Aslanian et al. |
| 2010/0094758 A1 | 4/2010 | Chamberlain et al. |
| 2010/0114724 A1 | 5/2010 | Ghosh et al. |
| 2010/0114747 A1 | 5/2010 | Kasower |
| 2010/0145840 A1 | 6/2010 | Kasower |

(56) References Cited

U.S. PATENT DOCUMENTS

| | | |
|---|---|---|
| 2010/0250411 A1 | 9/2010 | Ogrodski |
| 2010/0250497 A1 | 9/2010 | Redlich et al. |
| 2011/0087575 A1 | 4/2011 | Debie et al. |
| 2011/0137760 A1 | 6/2011 | Rudie et al. |
| 2011/0164746 A1 | 7/2011 | Nice et al. |
| 2011/0184838 A1 | 7/2011 | Winters et al. |
| 2012/0072464 A1 | 3/2012 | Cohen |
| 2012/0158574 A1 | 6/2012 | Brunzell et al. |
| 2012/0265607 A1 | 10/2012 | Belwadi |
| 2013/0018811 A1 | 1/2013 | Britti et al. |
| 2013/0031624 A1 | 1/2013 | Britti et al. |
| 2013/0211986 A1 | 8/2013 | Debie et al. |

FOREIGN PATENT DOCUMENTS

| | | |
|---|---|---|
| EP | 0 559 358 | 9/1993 |
| EP | 0 977 128 | 2/2000 |
| EP | 0 772 836 | 12/2001 |
| KR | 10-2004-0078798 | 9/2004 |
| WO | WO 95/34155 | 12/1995 |
| WO | WO 96/00945 | 1/1996 |
| WO | WO 98/41931 | 9/1998 |
| WO | WO 98/41932 | 9/1998 |
| WO | WO 98/41933 | 9/1998 |
| WO | WO 99/17225 | 4/1999 |
| WO | WO 99/17226 | 4/1999 |
| WO | WO 99/38094 | 7/1999 |
| WO | WO 00/04465 | 1/2000 |
| WO | WO 00/28441 | 5/2000 |
| WO | WO 01/84281 | 11/2001 |
| WO | WO 2013/009920 | 1/2013 |

OTHER PUBLICATIONS

U.S. Appl. No. 12/705,511, filed Feb. 12, 2010, Bargoli et al.
Bitran et al., "Mailing Decisions in Catalog Sales Industry", Management Science (JSTOR), vol. 42, No. 9, pp. 1364-1381, Sep. 1996.
Cohen et al., "Optimizer: IBM's Multi Echelon Inventory System for Managing Service Logistics", Interfaces, vol. 20, pp. 65-82, Jan.-Feb. 1990.
"Consumers Gain Immediate and Full Access to Credit Score Used by Majority of U.S. Lenders." PR Newswire, ProQuest Copy; Mar. 19, 2001; p. 1.
Elmasri et al., "Fundamentals of Database Systems, Third Edition (Excerpts),"pp. 253, 261, 268-70, 278-80, 585, 595, Jun. 2000.
Ettore, Paul Kahn on Exceptional Marketing. Management Review, vol. 38(11), Nov. 1994, pp. 48-51.
Expensr.com http://www.expensr.com/, as retrieved on Sep. 17, 2008.
Haffar, Imad, "'SPAM': A Computer Model for Management of Spare-Parts Inventories in Agricultural Machinery Dealerships", Computers and Electronics in Agriculture, vol. 12, Issue 4, Jun. 1995, pp. 323-332.
Handfield, Robert B. et al., "Managing Component Life Cycles in Dynamic Technological Environments", International Journal of Purchasing and Materials Management, Tempe, vol. 30, Iss. 2, p. 20, 9 pgs., Spring 1994, ProQuest ID 590096.
Ideon, Credit-Card Registry that Bellyflopped this Year, Is Drawing some Bottom-Fishers, The Wall Street Journal, Aug. 21, 1995, pp. C2.
Inderfurth et al., "Decision Support for Spare Parts Acquisition in Post Product Life Cycle", Central European Journal of Operations Research, vol. 16, pp. 17-42, 2008 [Initially published online Dec. 21, 2007].
Käki, Anssi, "Forecasting in End-Of-Life Spare Parts Procurement", Master's Thesis—Helsinki University of Technology System Analysis Laboratory, Jul. 27, 2007.
Kim, Bowon et al., Optimal Pricing, EOL (End of Life) Warranty, and Spare Parts Manufacturing Strategy Amid Product Transition, European Journal of Operation Research, vol. 188, pp. 723-745, 2008 [Initially published online May 1, 2007].
Klein, et al., "A Constant-Utility Index of the Cost of Living", The Review of Economic Studies, pp. 84-87, vol. XV-XVI, Kraus Reprint Corporation, New York, 1960.
Klein, et al., "An Econometric Model of the United States: 1929-1952", Amsterdam: North-Holland, 1955.
Klein, L.R, "The Keynesian Revolution", New York: MacMillan, 1947.
Krupp, James A.G., "Forecasting for the Automotive Aftermarket", The Journal of Business Forecasting Methods & Systems, Winter 1993-1994, 12, 4; ABI/Inform Global; pp. 8-12.
Lapide, Larry, "New Developments in Business Forecasting", The Journal of Business Forecasting, pp. 12-14, Spring 2002.
Moore, John R., Jr. "Forecasting and Scheduling for Past-Model Replacement Parts" Management Science, Application Series, vol. 18, No. 4, Part 1 (Dec. 1971), pp. 6200-B213.
Packer, A. H., "Simulation and Adaptive Forecasting an Applied to Inventory Control", Operations Research, vol. 15, No. 4, pp. 660-679, Jul. 1965.
Peters, Peter-Paul, "A Spare Parts Configurator for the European Service Business" (Graduation Report); Honeywell, Industrial Service Logistic Center; Amsterdam, The Netherlands; 80 Pgs.; Mar. 2000.
Porter, G. Zell, "An Economic Method for Evaluating Electronic Component Obsolescence Solutions", Retrieved from the web at www.gidep.org/data/dmsms/library/zell.pdf, May 1998, pp. 1-9.
Roos, Gina, "Web-Based Service Helps OEMs Cure Parts Obsolescence Blues", Electronic Engineering Times, p. 86, Oct. 8, 2001, Dialog 09056737 78968668.
Santarini, Michael, "Forecasts the Probably Obsolescence of Components—Module Predicts Parts Life.", Electronic Engineering Times, Jan. 11, 1999, p. 48(1), Dialog 0607160353548246.
Smith, Wendell R., "Product Differentiation and Market Segmentation as Alternative Marketing Strategies", The Journal of Marketing, pp. 3-8, vol. XXI, The American Marketing Association, Brattleboro, Vermont, Jul. 1956.
Stone, "Linear Expenditure Systems and Demand Analysis: An Application to the Pattern of British Demand", The Economic Journal: The Journal of the Royal Economic Society, pp. 511-527, vol. LXIV, Macmillan & Co., London, Sep. 1954.
Sullivan, Laurie, "Obsolete-Parts Program Thriving", EBN, Manhasset, Issue 1296, p. 26, Jan. 2002, ProQuest 10 101195090.
Various Posts from the http://www.2p.wrox.com Forums:http://web.archive.org/web/2005045221950/http://p2p.wrox.com/topic.asp?TOPIC_ID=6513 , dated Nov. 15, 2003-Oct. 7, 2004.
Web Page posted at: httb://web.archive.org/web20040805124909/http://www.oracle.com/technology/sample_codete/tech/pl_sql/htdocs/x/Case/start.htm, p. 1 and 4 of the web pages posted on Jan. 7, 2003.
Webster, Lee R., "Failure Rates & Life Cycle Costs", Consulting-Specifying Engineer; 23, 4; ABI/INFORM Global, Apr. 1998, p. 42.
Working, Holbrook, "Statistical Laws of Family Expenditure", Journal of the American Statistical Association, pp. 43-56, vol. 38, American Statistical Association, Washington, D.C., Mar. 1943.
International Search Report and Written Opinion, PCT/US2012/046316, mailed Sep. 28, 2012.
Experian, "Experian Rental Payment Data," http://www.experian.com/rentbureau/rental-data.html printed Nov. 22, 2013 in 2 pages.
Herron, Janna, "Social Media-Based Credit Score?" http://www.bankrate.com/financing/credit-cards/social-media-based-credit-score/, posted Friday, Jan. 13, 2012, printed Nov. 22, 2013 in 2 pages.
Medick et al., "German Agency to Mine Facebook to Assess Creditworthiness", Jun. 7, 2012, http://www.spiegel.de/international/germany/german-credit-agency-plans-to-analyze-individual-facebook-pages-a-837539.html printed Nov. 22, 2013 in 2 pages.
MicroBilt, "PRBC Credit Reporting Agency," http://www.microbilt.com/nontraditional-credit-report.aspx printed Nov. 22, 2013 in 2 pages.
Microfinance Africa, "Philippines: Microfinance Players to get Their Own Credit Info Bureau," Apr. 5, 2011, http://microfinanceafrica.net/microfinance-around-the-world/philippines-microfinance-players-to-get-their-own-credit-info-bureau/ printed Nov. 22, 2013 in 2 pages.

(56) References Cited

OTHER PUBLICATIONS

Pagano, et al., "Information Sharing in Credit Markets," Dec. 1993, The Journal of Finance, vol. 48, No. 5, pp. 1693-1718.

Ponniah, Paulraj, "Data Warehousing Fundamentals: A Comprehensive Guide for It Professionals", Wiley-Interscience Publication, pp. 257-289, 377-397, Aug. 3, 2001.

Rahm, et al. "Data Cleaning: Problems and Current Approaches", Bulletin of the IEEE Computer Society Technical Committee on Data Engineering, Dec. 2000, vol. 23, No. 4, pp. 11.

Raman, et al., "Potter's Wheel: An Interactive Data Cleaning System", Proceedings of the 27th VLDB Conference, Roma, Italy, 2001, pp. 10.

* cited by examiner

OrchestrationStudio

Name: -Admin 1    Sign Out

Dashboard

Viewing 81-100 of 816 matches

<First<5 6 7 8 9 10... ▸Last>

| Seq | Bureau Member Name | File Name | File Arrival Date | Validation | Validation QA | Data Load | Data Load QA | Backout |
|---|---|---|---|---|---|---|---|---|
| 81 | Member 81 | 345.PBK20120119.txt | 27-June-2012 16:42 | 27-June-2012 | 27-June-2012 | 27-6-12 | ⌐ | - |
| 82 | Member 82 | 345.PBK20120117.txt | 27-June-2012 13:59 | 27-June-2012 | 27-June-2012 | 27-6-12 | ⌐ | - |
| 83 | Member 83 | 389.PBK20110311.txt | 27-June-2012 12:31 | 27-June-2012 | 27-June-2012 | 27-6-12 | ⌐ | - |

[HOME]

FIG. 7

OrchestrationStudio

Name: -Admin 1    Sign Out

Account List > BANK 1.CCA.20120602.txta   06-Jul-2012 (VALIDATION)

Collapse all categories    Export to Excel | Export Samples for REF DEDUP VAL

| Category | 06-Jul-2012 12:03 | | | | | | | | | |
|---|---|---|---|---|---|---|---|---|---|---|
| ▼ DATA_PREP | | | | | | | | | | |
| ▼ DE-DUP | | | | | | | | | | |
| ▶ INPUT | | | | | | | | | | |
| Total Input Records | 13 | --- | --- | --- | --- | --- | --- | --- | --- | --- |
| ▶ REJECTED | | | | | | | | | | |
| Total Rejected Records | 3 | --- | --- | --- | --- | --- | --- | --- | --- | --- |
| ▶ ACCEPTED | | | | | | | | | | |
| Total Accepted Records | 10 | --- | --- | --- | --- | --- | --- | --- | --- | --- |
| ▼ VALIDATION | | | | | | | | | | |
| ▶ INPUT | | | | | | | | | | |
| ▲ Total Input Records | 10 | --- | --- | --- | --- | --- | --- | --- | --- | --- |
| ▶ REJECTED | | | | | | | | | | |
| ▲ Total Rejected Records | 7 | --- | --- | --- | --- | --- | --- | --- | --- | --- |
| ▶ ACCEPTED | | | | | | | | | | |
| ▲ Total Accepted Records | 3 | --- | --- | --- | --- | --- | --- | --- | --- | --- |
| ▲ Total Number of Records with Optional Segment Rejects | 10 | --- | --- | --- | --- | --- | --- | --- | --- | --- |

HOME

FIG.8

OrchestrationStudio

Name: -Admin 1 | Sign Out

Member Profile | Data Supplier Profile

Member Details
Company Lookup  Company ID: 33333  Company Name: Bank
Bureau Member ID:
Bureau Member Name:
Member Status: Select...  Industry Type: Select...
Member Status Date:  Industry Type Detail: Select...
 Start Date:
 End Date:
 Last Update Date:

Member Identification Information
Identity Number Type: Select...  Identity Country of Issue: Select...
Identity Number:  Identity Place of Issue:
Identity Issue Date:  Identity Issuer Name:
Identity Expiration Date:

Member Address Information
Address Line 1:  Region Code: Select...
Address Line 2:  Country Code: Select...
Address Line 3:  Postal Code:
Locality Name:
Web Address Type: Select...  Web Address:

Contact Person Information
Contact Person Name:
Contact Person Phone:

HOME                                        Continue

FIG. 9

OrchestrationStudio

Name: -Admin 1 |   Sign Out

Member Profile | (Data Supplier Profile)

Data Supplier Data Contribution Profile

Data Type Profile

| Data Type | Data Provider (if different from BM) | Creation Date | Last Edit Date | Edit Profile | |
|---|---|---|---|---|---|
| Consumer Credit Accounts | Bank | 15-July-2011 | - | Edit | Delete |
| Consumer Credit Accounts | Finance Services | 15-April-2011 | - | Edit | Delete |
| Consumer Credit Accounts | Some Bank | 01-Feb-2012 | - | Edit | Delete |

Add New Data Type

Data Type Profile Creation Data            Update Frequency
                                           -Select- Supplier Display Name (Optional)           Data Owner Name

*if different from bureau member*

Bureau Member Type
-Select-

Auto Statistics Report
                                           ○ Yes   ○ No

Request FTP Username & Password

*(For Internal Use only)*
*Default Inbox Location:*   /Bureau Member Id/ Inbox / Data Type
*Default Outbox Location:*  /Bureau Member Id/ Outbox HOME                                       Save Profile

Commercial Credit History

| Date | Amount | Financial Resp. | Type | Purpose | Industry | Creditor Name |
|---|---|---|---|---|---|---|
| List text | List text | List text | List text | List text | List text | List text |
| List text | List text | List text | List text | List text | List text | List text |
| List text | List text | List text | List text | List text | List text | List text |

Statement
Disputes
Corrections
Delete

| Reference | Account Type | Financial Resp. | Status Date | Status | Current Default Amt | | |
|---|---|---|---|---|---|---|---|
| xxxxxxx4521 Financial Services Bank | Installment Open | Joint | 01-01-2012 | Default | $10,000 | View: 0 Borrowers | 0 Pymt History |
| xxxxxxx4521 Financial Services Bank | Installment Open | Joint | 01-01-2012 | Default | $10,000 | View: 0 Borrowers | 0 Pymt History |
| xxxxxxx4521 Financial Services Bank | Installment Open | Joint | 01-01-2012 | Default | $10,000 | View: 0 Borrowers | 0 Pymt History |

MENU | HOME | Create PDF | Notes/Statements | Split | BACK 0 errors/ 0 warning

| Date | Amount | Financial Resp. | Type | Purpose | Industry | Creditor Name |
|------|--------|-----------------|------|---------|----------|---------------|
| List text | List text | List text | List text | List text | List text | List text |
| List text | List text | List text | List text | List text | List text | List text |
| List text | List text | List text | List text | List text | List text | List text |

Commercial Credit History

Reference    Account Type    Financial Resp.    Status Date    Status    Current Default Amt    Delinquency Counters
                                                                                                                                    30+ Days    60+ Days    90+ Days xxxxxxx4521    Installment Open    Joint    01-01-2012    Default    $10,000         0         0         0
Financial Services
Bank                                                                                                                                                View: Borrowers    Pymt History Dispute - Dispute flag is added - 01-01-2012
Dispute - Dispute outcome is delivered to Consumer. Consumer wishes to keep dispute on file. -01-01-2012
Statement - Consumer indicates financial hardship. -01-01-2012 xxxxxxx4521    Installment Open    Joint    01-01-2012    Default    $10,000         0         0         0
Financial Services
Bank                                                                                                                                                View: Borrowers    Pymt History

[MENU]    [HOME]    Create PDF | Notes/Statements | Split    [BACK]

0 errors / 0 warning

| file://C:/ul.html | | | | | ☆ ▽ ⌂ ⊞▾ | | 🔍 |
|---|---|---|---|---|---|---|---|
| Date | Amount | Financial Resp. | Type | Purpose | Industry | Creditor Name | |
| List text | List text | List text | List text | List text | List text | List text | |
| List text | List text | List text | List text | List text | List text | List text | |
| List text | List text | List text | List text | List text | List text | List text | |

Commercial Credit History

| Reference | Account Type | Financial Resp. | Status Date | Status | Current | Default Amt | Delinquency Counters 30+ Days  60+ Days  90+ Days |
|---|---|---|---|---|---|---|---|
| xxxxxx4521 Financial Services Bank | Installment Open | Joint | 01-01-2012 | Default | $10,000 | | SOFT DELETED |
| xxxxxx4521 Financial Services Bank | Installment Open | Joint | 01-01-2012 | Default | $10,000 | | 0  0  0 View: Borrowers  Pymt History |
| xxxxxx4521 Financial Services Bank | Installment Open | Joint | 01-01-2012 | Default | $10,000 | | 0  0  0 |

| ◁ MENU | [HOME] | Create PDF | Notes/Statements | Split | [BACK] ▷ |
|---|---|---|---|---|---| x    0 errors/ 0 warning

*FIG. 17*

Username: Bank | Sign Out

Personal Credit Report

Report Num: 4444444444   06-06-2012 12:03:20 AM
Client Ref1: 55555555   Client Ref2: 111111111
Match Found On file since 2008

| John Doe | Address | | Date of Birth: 17-12-1979 |
|---|---|---|---|
| Gender: Male | 1111 A Street | [C] | Driver's License: AAAAAAA |
| Business Name: ABC Corp | New York, NY 11111 | [Report on 05-02-2010] | Statements and Alerts present in this report: No |
| ABN Numbers: 777777777 | 2222 B Street | [P] | Employer Name: ABC Corp. |
| Alias Names: | New York, NY 11111 | [Report on 08-08-2011] | View History |
| Johnny Doe | 3333 C Street | [P] | |
| Joe Doe | New York, NY 11111 | [Report on 08-08-2011] | |
| John | | | |

Personal History

| Name | Date of Birth | Date of Birth | Gender | Drivers License | Employer |
|---|---|---|---|---|---|
| John Doe | 17-12-1979 | | | AAAAAAA | ABC Corp. |
| Report on: 01-01-2012 | Report on: 01-01-2012 | System Data | | Report on: 01-01-2012 | Report on: 01-01-2012 |
| Johnny(Also known As) | 17-12-1979 | Insert: 02-02-2006; 05:05:05; IMS Insert User ID: 222222 IP: 25.25 | | AAAAAAA | ABC Corp. |
| Report on: 05-11-2011 | Report on: 05-11-2011 | Update: 02-02-2010;05:05:05;IMS Update User ID: 222222 IP: 25.25 | | Report on: 05-11-2011 | Report on: 05-11-2011 |
| Joe(Also known As) | 17-12-2011 | xxxxxx452 | DB Load ID: 11111111 | AAAAAAA | ABC Corp. |
| Report on: 05-11-2011 | Report on: 05-11-2011 | First reported Date: 02-02-2006 First reported Date: 02-02-2010 Occurrence Count: 5 Bureau member ID: 2222222222 Data Type: CCA | | Report on: 05-11-2011 | Report on: 05-11-2011 |

Report Summary <attributes are different for co Data Type Key: 3333333   mercial report>

| Date Most recent CCA & BCA Inquiry: 02-02-2012 | o Total Value of files (CCA & BCA): | # CCA & BCA Defaults: | 4 |
|---|---|---|---|
| # Searches last 30 days (CCA & BCA): 2 | o Total Value of files (CCA & BCA): | # CCA & BCA Settled Defaults: | 2 |
| # CCA & BCA SCI: 2 | | # on file - Housing Loan CADs (CCA & BCA): | 3 |
| # CCA & BCA Inquiry: 3 | | # on file - Installment CADs (CCA & BCA): | 2 |
| Total CCA & BCA Default Amounts: 4,000 | | # on file - Retail CADs (CCA & BCA): | 2 |
| Total Value of files (CCA & BCA): 3,000 | | # on file - Revolving CADs (CCA & BCA): | 1 |
| Total Value on file (Public Record): 0 | | # on file - Telco CADs (CCA & BCA): | 0 |
| Time since most recent Bankruptcy: 30-04-2004 | | # Bankruptcies: | 1 |
| Time since most recent Judgment: 03-04-2004 | | # Judgments: | 1 |
| Current Bankruptcy Status: Finalized | | | More |

Consumer Credit History <applicable for 'Consumer' and 'Consumer & Commercial' report>

Consumer Default Accounts

| Reference | Account Type | Financial Resp. | Status Date | Status | Current Default Amt | Delinquency (days) 30 60 90 | |
|---|---|---|---|---|---|---|---|
| xxxxxx4521 Financial Services Bank | Installment Open | Joint | 01-01-2012 | Default | $10,000 | 1  1  1 | Borrower History Payment History |

[HOME]

Split File

Split file functionality splits the records in to multiple PINs/BINs if the file contains mixed records.

- Account #: 3333333333
  Account Type: Installment
  Account Date: 01-01-2011
  Industry Name: Bank
  Person Name: Johnny Doe
  Address: 1111 A Street
  New York, NY 11111

- Account #: *222222222
  Account Type: Revolving
  Account Date: 01-01-2010
  Industry Name: Bank
  Person Name: John Doe
  Address: 3333 C Street
  New York, NY 11111

- Inquiry Date: 02-02-2011
  Inquiry Purpose: Extension of credit
  Creditor Name: Bank
  Inquiry Amount: -

- Public Record: Bankruptcy
  Court Case No: 2323234
  Filing Date: 01-01-2009
  Status: Open: Open

- Public Record: Bankruptcy

MOVE >>
<<MOVE

Submit  Cancel

HOME

SYSTEMS AND METHODS FOR LARGE-SCALE CREDIT DATA PROCESSING

CROSS REFERENCE TO RELATED APPLICATIONS

This application claims the benefit of U.S. provisional Application No. 61/507,092, filed Jul. 12, 2011 and entitled "SYSTEMS AND METHODS FOR GLOBAL NEXT GENERATION INFORMATION BUREAU," the disclosure of which is hereby incorporated by reference in its entirety.

BACKGROUND OF THE DISCLOSURE

1. Field of the Disclosure

Among other things, this disclosure describes systems and methods for processing large volumes of credit data and other data received from a number of data sources, and providing credit-related products and other products based on the processed data.

2. Description of the Related Art

Credit data may be maintained by a credit bureau or similar entity. Credit data maintained by a given credit bureau may include account data for millions or even billions of customers, where each customer identified in the data may have one or more accounts. The credit data may be based on several sources of data which include existing trade data, new trade data, inquiries, public record data (for example, bankruptcy filings), change of address data, and so forth. A common type of credit data is "tradeline data" (or trade data). Tradeline data may be an entry by a credit grantor to a consumer's credit history which is maintained by a credit reporting agency. A tradeline describes the consumer's account status and activity and can include names of companies with which the applicant has accounts, dates the accounts were opened, credit limits, types of accounts, account balances, payment histories, and/or other data.

In the United States, for example, multiple credit bureaus are constantly receiving data from a large number of data sources, including, for example, banks, creditors and other account providers. The credit bureaus use the data, among other things, to provide credit reports, credit scores and other credit-related products or services to consumers and businesses. The systems of a given credit bureau are typically tailored to specific legal and business requirements of the country or region in which the bureau operates, as well as the needs of its customers, which may have evolved over a long period of time. Accordingly, the systems of a typical credit bureau are not easily adaptable to comply with different business needs and/or legal regulations than those for which the systems are currently designed.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIGS. 4-19 are illustrative embodiments of user interfaces that may be generated and presented for display by a bureau orchestration module or other module described herein.

DETAILED DESCRIPTION

Figure 1:
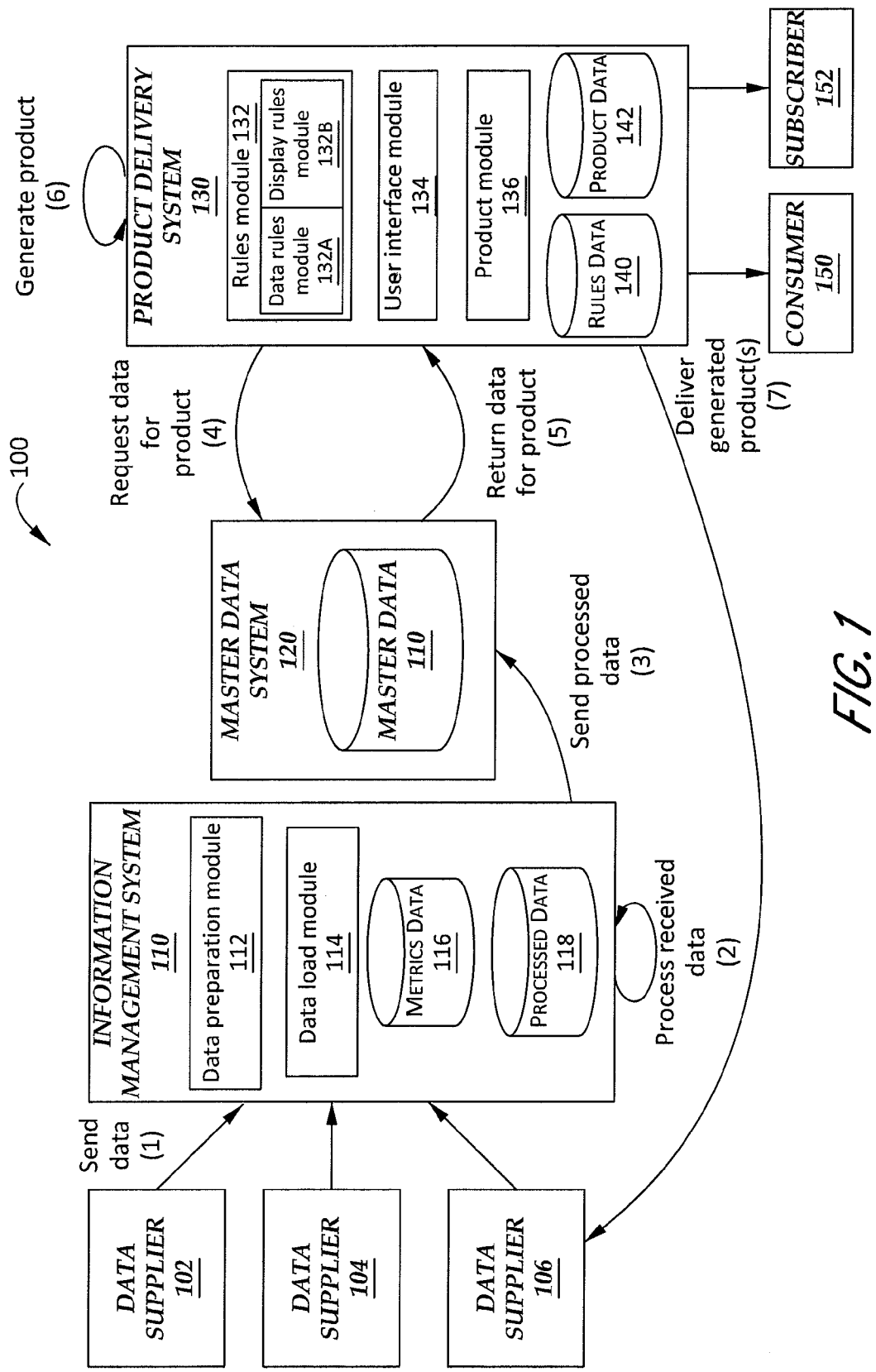
FIG. 1 illustrates one embodiment of a data flow in an illustrative operating environment for maintaining credit data received from a variety of data sources and providing credit-related products to consumers and subscribers.

Various embodiments of systems, methods, processes, and data structures will now be described with reference to the drawings. Variations to the systems, methods, processes, and data structures which represent other embodiments will also be described.

Generally described, aspects of the present disclosure relate to systems and methods that enable a credit bureau or other entity that maintains credit data and/or other data to load data, process data and deliver products utilizing the processed data in a manner that is scalable and adaptable to changing conditions, business needs and/or legal requirements for various countries or regions. Accordingly, in some embodiments, aspects of the present disclosure enable systems for large-scale credit data processing to be deployed worldwide with minimal customization for each deployment country or region by implementing various features and capabilities related to operating a consumer and/or commercial credit bureau.

As discussed herein, aspects of the present disclosure include receiving and processing data from a potentially large number of data suppliers or data sources. The data may include, in some embodiments, consumer data, business data, account history, ledger account data, financial statements, firmographics, public records, alerts, insurance information, vehicle records, rental information, commercial/business data, microfinance data, and/or other types of data. In some embodiments, data may be received as either structured data or unstructured data. Aspects of the present disclosure may enable processing and analysis of data not traditionally considered by a credit bureau, such as banking transaction data, credit card transaction data, online purchase information, utility data, social network data, and so forth. In some embodiments, data other than credit data may be identified as relevant for credit reporting purposes, and may be tied directly or indirectly to a given individual or company. As one example, if a given individual owns a car identified by a certain vehicle identification number or other identifier, aspects of the present disclosure may associate that vehicle with the individual such that insurance information, purchase or sale data, and/or repair data for the given vehicle may be identified in data sets received from one or more data suppliers and automatically associated with the individual's records.

Aspects of the disclosure, according to one embodiment, relate to a credit reporting system that may include an information management system configured to process a plurality of large data sets. The information management system may include an interface module configured to periodically receive a plurality of large data sets including trade data, a memory configured to store large processed data sets and metrics regarding the large processed data sets, a data processing module configured to automatically process the received plurality of large data sets in parallel and to store the processed data sets in the memory, and an account module configured to store account-specific criteria regarding the processing of the plurality of large data sets. The credit reporting system may also include a database configured to communicate with the information management system, to receive the processed plurality of large data sets from the information management system, and to store the plurality of large data sets as a set of data objects in the database. The credit reporting system may further include a product delivery system configured to electronically communicate with the database. The credit reporting system may include a rules engine configured to store a first set of rules related to a first account, where the first set of rules identify a first subset of data objects from the database that correspond to the first account and a first reporting format for the first account. The credit reporting system may further include an inquiry module configured to receive a credit report request, determine that the credit report request is related to the first account, access the database using the first set of rules related to the first account to retrieve data corresponding to the first subset of data objects, receive data from the database that complies with the first set of rules, format the received data in the first reporting format, and return the formatted data.

Other aspects of the disclosure, according to one embodiment, relate to a credit reporting system that may include an information management system configured to process a plurality of large data sets. The information management system may include an interface module configured to periodically receive a plurality of large data sets including trade data, a memory configured to store large processed data sets and metrics regarding the large processed data sets, a data processing module configured to automatically process the received plurality of large data sets in parallel and to store the processed data sets in the memory, where the processing may include validating the trade data, tracking metric data about the processing of the plurality of large data sets, and storing the metric data in the memory. The credit reporting system may include an account module configured to store account-specific criteria regarding the processing of the plurality of large data sets, to automatically determine whether one of the account-specific criteria have been met using the metric data, and if one of the account-specific criteria have been met, to automatically generate an electronic notification to report the one of the account-specific criteria. The credit reporting system may further include a credit reporting database configured to communicate with the information management system, to receive the processed plurality of large data sets from the information management system, and to store the plurality of large data sets as a set of data objects in the credit reporting database.

Other aspects of the disclosure, according to one embodiment, relate to a credit reporting system that includes a database configured to store a plurality of large data sets as a set of data objects in the database, and a product delivery system configured to electronically communicate with the database. The product delivery system may include a rules engine configured to store a first set of rules related to a first account, where the first set of rules identifies a first subset of data objects from the database that correspond to the first account and a first reporting format for the first account. The rules engine may include a user interface module configured to allow the identification of the first subset of data objects and modifications to the identification of the first subset of objects. The credit reporting system may further include an inquiry module configured to receive a credit report request, determine that the credit report request is related to the first account, access the database using the first set of rules related to the first account to retrieve data corresponding to the first subset of data objects, receive data from the database that complies with the first set of rules, format the received data in the first reporting format, and return the formatted data.

Other aspects of the disclosure, according to one embodiment, relate to a computer-implemented credit data reporting method. The method may include receiving, by a computer processor, a plurality of large data sets including trade data, where each of the plurality of large data sets may include millions of records, and automatically processing the received plurality of large data sets in parallel. The processing may include validating the trade data, tracking metric data about the processing of the plurality of large data sets, and storing the metric data in a memory. The method may further include storing the processed data sets in the memory, receiving electronic representation of account-specific criteria regarding the processing of the plurality of large data sets, and storing the electronic representation of account-specific criteria. The method may include automatically, by a computer processor, determining whether one of the account-specific criteria related to a first account have been met as to one of the plurality of large data sets using the metric data. If one of the account-specific criteria has been met, the method may include automatically generating an electronic notification to report the account-specific criteria.

Other aspects of the disclosure, according to one embodiment, relate to a computer-implemented credit data configuration method. The method may include receiving, by a computer processor, a first set of rules related to a first account the first set of rules identifying a first subset of data objects from a database that correspond to the first account and a first reporting format for the first account. The method may then include storing the first set of rules in a persistent memory, receiving a credit report request related to the first account, automatically determining that the credit report request is related to the first account, automatically electronically accessing the database using the first set of rules related to the first account to retrieve data corresponding to the first subset of data objects, automatically receiving data from the database that complies with the first set of rules, automatically formatting the received data in the first reporting format, and automatically returning the formatted data.

Example Credit Reporting Environment and Data Flow

FIG. 1 illustrates one embodiment of an architecture and overall data flow of an illustrative operating environment 100 for maintaining credit data and other data received from a variety of data sources and providing credit-related products to consumers and subscribers. As illustrated, the illustrative operating environment 100 includes an information management system 110, a master data system 120 and a product delivery system 130. In certain embodiments, the information management system 110, master data system 120 and product delivery system 130 may be collectively operated by a credit bureau or similar entity in order to receive, process, maintain and analyze credit data and other types of data relevant to consumers and/or businesses, including generating products, such as credit reports and credit scores, based on the processed data. The components illustrated in FIG. 1 may each be configurable based on particular needs of a specific operator. In some embodiments, each system and/or module illustrated in illustrative operating environment 100 may be responsible for implementing certain features, such that a given component, system and/or module may be swapped with a replaced or modified component, system or module without affecting performance of the operating environment as a whole or requiring changes to the other components, systems or modules. The various components of illustrative operating environment 100 are described in more detail below, followed by a description of the overall data flow illustrated in FIG. 1.

Information Management System

The information management system 110 may, in some embodiments, be configured to load and process high volumes of data received from a variety of data suppliers or data sources. In some embodiments, the data from multiple sources may be processed in parallel and loaded to the master data system 120 without affecting the performance of the product delivery system 130 or other systems that may utilize or communicate with the master data system 120. The information management system may enable horizontal scaling in which various data entries may be matched to a personal identifier, business identifier or other entity identifier in real-time or near real-time prior to, or in parallel with, other data processing tasks.

Data consistency may be maintained, for example, by combining transaction objects such as trade, public records and entity objects (such as name, address and/or other data entries) into a single data object with flexible formatting requirements. In some embodiments, the data object may be stored in a dynamic, variable-length object structure. Accordingly, the information management system may combine and/or bind data together, and may process the data in a transaction mode based on the created data objects. For example, each record or data entry may be processed as a discrete transaction, where transactions may each be processed independently in parallel with other transactions, or may be processed in batches with other records, depending on the embodiment. In some embodiments, the information management system may provide an adaptable framework that can easily be modified or expanded to accept and process data of different types. For example, rules and/or definitions may be identified or defined relative to specific data types, data fields, data sources, and/or other data elements or associations.

As illustrated, the information management system 110 includes a data preparation module 112, a data load module 114, a metrics data store 116, and a processed data store 118. The data preparation module 112 may prepare received data to be loaded into the master data system 120. For example, the data preparation module 112 may reformat data, de-duplicate data, parse data, validate input, and/or split the data. The data load module 114 may extract data, load data, perform delta operations, match data, cleanse data, and/or perform load validation when storing data to the processed data store 118. Reformatting the data may include converting data received in any of a variety of data formats into a single universal format for use by the various components described herein. For example, data may be received in a format specified by one or more country's regulations as a standard credit data format, but may be reformatted by the information management system into a proprietary format or other universal format for ease of processing and storage. Matching the data may include identifying each record in the data and matching each record (directly or indirectly) to a uniquely identified individual, business or other entity. As will be appreciated, the data preparation module and data load module may be combined in a single module and/or may each perform a different combination of features, depending on the embodiment.

In some embodiments, the information management system 110 may implement tracking features. For example, the information management system may track file delivery from data suppliers in order to ensure that all scheduled files expected from one or more data suppliers are received when expected. For example, the information management system may store account preferences or account history information that indicated that a given bank typically sends data to the information management system at or near 2:00 pm every Tuesday. This time may be associated with a time window, such as plus or minus two hours (or any other time period). The expected data delivery time and/or time window may be set by the bank or other account holder, set by an operator of the information management system, automatically determined by the information management system based on historic data, or based on one or more other methods of data analysis. The information management system may track a large number of accounts and generate an alert or report indicating when an expected data delivery did not occur. In some embodiments, these alerts may be generated and delivered in real-time, while in other embodiments they may be compiled in a batch report.

The information management system may, according to certain embodiments, analyze metrics related to data loading and/or processing as well as data quality. These metrics may be analyzed at the system level or the account level. For example, the information management system may track and store metrics information in the metrics data store 116. The metrics data store 116 may include account-specific criteria to be tracked, and/or historic metrics and data analysis results associated with a large number of accounts. One or more metrics may relate, for example, to data quality of the data received from a given data supplier or account holder. For example, when each of data suppliers 102, 104 and 106 sends data to the information management system for processing and storage, the information management system may determine whether the data is valid or whether it falls outside of defined quality thresholds established for the master data system and/or for the specific data supplier. For example, if a given financial institution typically provides a certain number of records in each data update, the information management system may determine whether the number of records in a given data batch received from that financial institution suggests that the data may be incomplete (for example, is smaller than expected) or may include erroneous or extraneous data (for example, is larger than expected). Certain parameters may be either manually set or automatically determined with reference to an expected size (such as either a file size or number of records) and a size window, such as plus or minus 10% of the expected size being defined as an acceptable range. If the information management system determines that the data received from a given data supplier is not in the accepted range, an alert may be generated. In some embodiments, the information management system may process the data in addition to generating the alert of potential problems, while in other embodiments, the information management system may delay processing until substitute data is sent and/or the sent data is confirmed by an operator and/or the data supplier.

Some parameters that may be tracked include total input records, total rejected records, total accepted records, total number of records with optional segment rejects, total records with account type cross field errors, total records with status cross field errors, and total records with date cross field errors.

Master Data System

In one embodiment, the master data system 120 may generally maintain processed data in a form that is accessible for generation of credit reports, credit score and/or other products that utilize the stored data. In some embodiments, the processed data stored in master data store 122 may include millions of records, including credit data and/or other data associated with individuals and/or businesses. The data stored in master data store 122 may be continuously updated with data received and processed by the information management system 110 from a variety of initial data source or data suppliers. The master data system 120 may additionally include one or modules (not illustrated) that provide access to the data stored in master data store 122 and/or which enable modification or addition to the stored data. For example, in some embodiments, the product delivery system 130 may access the master data store 122 directly. In other embodiments, the master data system 120 and/or other systems requesting access to data stored in master data store 122 may do so only through requests received by modules of master data system 120.

Product Delivery System

In one embodiment, the product delivery system 130 may generally enable users, such as consumer 150 and subscriber 152, to define custom products, such as credit reports, that utilize the data stored in master data system 120. Based on product specifications for a given consumer or commercial product, and considering rules maintained by the product delivery system, the product delivery system may generate a product and deliver the generated product to the consumer. In some embodiments, the product delivery system may enable concurrent access by a large number of clients and may be linearly scalable based on business needs of a given credit bureau or other operator.

As illustrated in FIG. 1, the product delivery system 130 includes a rules module 132, which includes data rules module 132A and display rules module 132B. The rules module 132 may retrieve and consider rules data stored in rules data store 140 when generating products, such as credit reports, and when responding to inquiries from users. Data rules may generally define which data types, data fields, and/or groups of data (also referred to as data bands) are available to potentially be accessed or included in a product, such as a credit report as well as what data types, data fields, and/or data bands are required. The display rules may generally define which of those potentially available data types, data fields, and/or data bands are accessible for display with respect to a specific account, specific product and/or specific user as well as what data types, data fields, and/or data bands are required. The display rules may be set at the time of an inquiry by a user, may be set in advance across an account (such as for all of a bank's users), or may be set in advance for a particular user or group of users (such as a bank user that falls into a specific customer subset). As one example, the bank's vice presidents may have access to more data types, data fields, and/or data bands than the bank's mortgage account representatives. Data rules and/or display rules stored in rules data store 140 may include underlying regulatory or compliance rules (such as legal requirement regarding data fields that must be included when providing credit data in a given region), account-level rules and/or user-level rules. For example, according to one embodiment, product-specific data for a given product defined at the user level must comply with rules for the user, which must comply with the rules for the account associated with the user, which in turn must comply with regulatory and compliance rules.

As an example according to one embodiment, the rules module 132 may provide access to fifty different data types, forty five of which may each be selected by a user as either on or off for a specific product, while five may be required data types. A user may define a given product by selecting at least a subset of the optional available data types via one or more user interfaces generated by the user interface module 134. The user interface module 134 may communicate with the rules module 132 in order to determine the available data and/or required data for a specific region, account or user. The user interface module 134 may additionally communicate with the product module 136 in order to determine available product options such as display formats, delivery considerations, and so forth. The product data 142 may store product specification information, including account-specific products, predefined products (such as a credit report template), one or more previously defined report formats, campaign templates, common credit inquiries, and so forth. In some embodiments, the financial cost billed to a user for a product generated and delivered to the consumer may be also be determined and tracked by the product module 136 based on the specific data bands or data types included in the product.

In some embodiments, the product delivery system 130 may maintain a high level of data granularity, such that products may be defined with reference to specific data bands, data types, data fields, or other discrete portions of stored data records. Each data type or data band may be managed at least in part based on metadata associated with the data. For example, personal data, employment data and vehicle data associated with a given individual may be grouped into data bands based on metadata stored in association with the data. Similarly, different data types within a given data band may be independently managed based on metadata.

In one embodiment, the product delivery system 130 may provide an operator with closed user group options. Such an option may enable an operator to define rules governing what data is accessible to a given account holder. For example, the product delivery system may be configured such that a given bank that provides data to the information management server 110 can access that data via one or more products generated by the product delivery system, but that other banks or entities are not able to access the data provided by that bank. Accordingly, while the data provided by the given bank may be processed and stored in master data store 122 along with a number of other banks' data (which may be stored without compartmentalization at the storage level), the product delivery system may nonetheless manage data permissions to this data at the account level based at least in part on metadata. In some embodiments, the product delivery system may be configured to enforce reciprocity rules, such that each data supplier may only receive back certain data types in response to report requests or other product requests if the given supplier supplies that type of data. As an example according to one such embodiment, if a given insurance company does not provide vehicle data to the information management system 110, the insurance company may not be granted access to consumers' vehicle data via the product delivery system 130.

Example Data Flow

As noted above, FIG. 1 illustrates one embodiment of an overall data flow of illustrative operating environment 100. The illustrative data flow begins with each of data suppliers 102, 104 and 106 sending data to the information management system 110. The data from each data supplier may be received at different times, or may be received simultaneously. As discussed above, the data may include a large variety of data types, such as consumer data, business data, vehicle data, real property data, unstructured transaction data, and/or other types of data. The information management system 110 may be capable of receiving large data sets, such that each set of data received from a given data supplier may include millions of records, where each record may be associated with a different individual, business, vehicle, property, account or other entity.

In the illustrative data flow, the information management system 110 processes the data sets received from the various data suppliers in parallel. Pre-processing and processing the data, including generating alerts and tracking metrics, are described in more detail above, as well as with reference to FIG. 2 below. The information management system may at least temporarily store the processed data in process data store 118 as a cache of data to be integrated with master data store 122. Once the data is processed, the information management system sends the processed data to master data system 120 for storage in master data store 122.

At any point after the master data system 120 has been initially populated with data, the product delivery system may request data from the master data store 122 in order to build one or more products based on the data. In some embodiments, the master data system may be continuously updated with new data as it is received from data suppliers and processed by the information management system 110. During data updates, the master data system 120 remains accessible to the product delivery system 130 in order to provide the most current credit data and other data for generation of credit reports, credit scores or other products. As illustrated in FIG. 1, the product generation data flow begins with the product delivery system 130 requesting data for a given product from master data system 120. The data request may be sent, for example, in response to a specific product request from consumer 150 or subscriber 152, or may be requested as part of a scheduled or batch product generation process initiated by the product delivery system. The product may be defined, in some embodiments, by a set of rules associated with an account, a user and/or a region.

The master data system may respond to the data request with credit data and/or other data relevant to the request. For example, if the product is a credit report for a particular individual, the master data system may return the individual's credit data associated with particular bands of data, as specified by a product definition or specification for the given credit reporting format stored in association with the product delivery system. As another example, if a subscriber requests the subscriber's standard credit score report for a set of businesses and also requests information about each of the businesses' annual spend, the master data system may return the businesses' credit scores associated with particular bands of data, as specified by a specification for the subscriber's credit score reporting format, but also add onto the report data from one or more data bands related to annual spend. In the illustrated embodiment, once the product delivery system receives the data, the product delivery system generates the product according to the relevant data rules, display rules and product reporting format. The generated product or products may then be provided to the relevant client(s), such as consumer 150, subscriber 152 and/or data supplier 106. Illustrative methods for generating products are discussed in more detail below with reference to FIG. 3.

Example Methods

Figure 2:
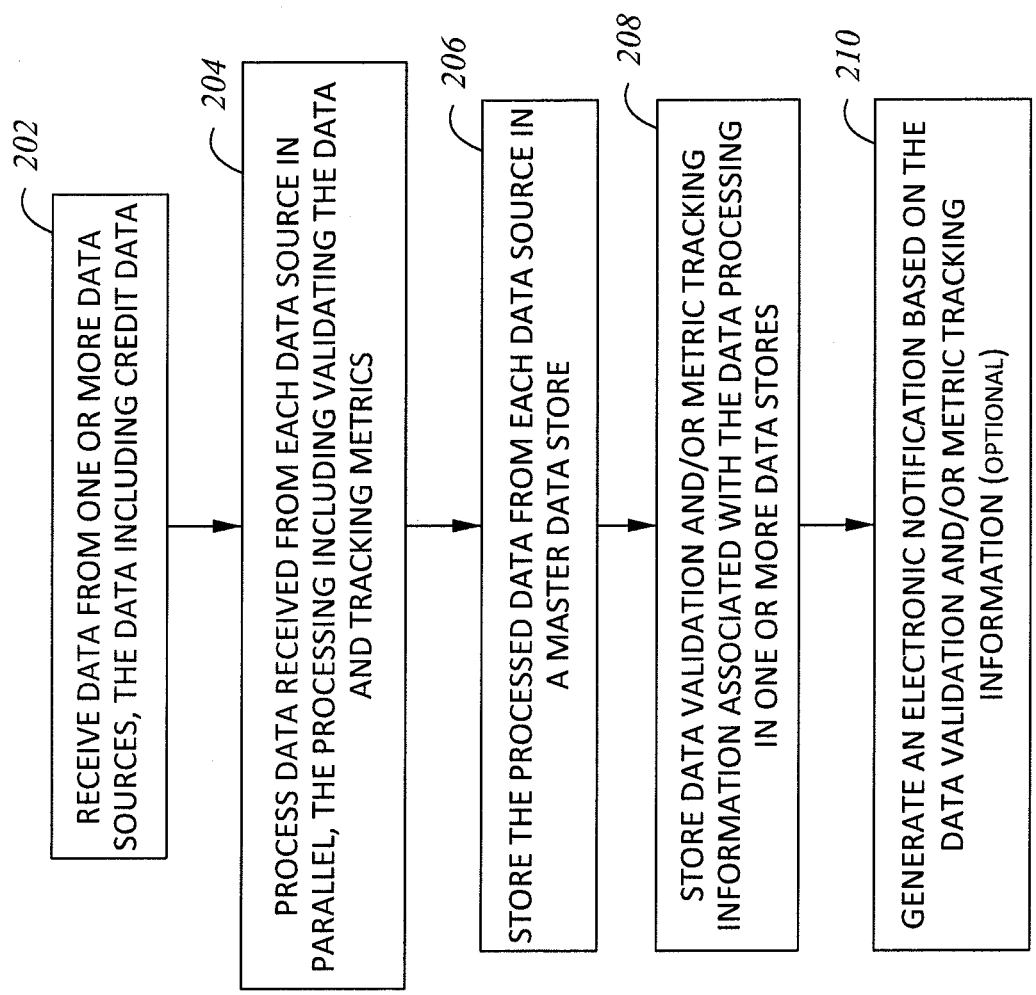
FIG. 2 is a flow chart illustrating one embodiment of a method for processing credit data and/or other data received from a variety of data sources.

FIG. 2 is a flow chart illustrating one embodiment of a method implemented by the information management system 110 for receiving and processing credit data and/or other data received from a variety of data sources. The illustrative method begins at block 202, where the information management system receives data from one or more data sources or data suppliers. As discussed above, the received data may include consumer data, business data, account history, financial statements, public records, insurance information, vehicle records, rental information, property information, microfinance data, and/or other types of data. The received data may include, for example, data submitted to the information management system by financial entities or other account providers to be included in credit files for a number of consumers and/or businesses for which the data supplier maintains accounts. In some embodiments, the data may include data that the information management system specifically requested from one or more data sources, such as a public records data source. The data may also include non-credit data which can be directly or indirectly linked or tied to a consumer and/or business.

Once the data from the one or more data sources is received, the illustrative method proceeds to block 204, where the information management system processes the data received from each source in parallel. In processing the data and/or preparing the data for processing, the information management system may perform one or more of the following: reformat data, de-duplicate data, parse data, validate input, split the data, extract data, load data, perform delta operations, match data and/or cleanse data. Processing the data may also include validating the data and/or tracking metrics related to data loading and/or processing, which may occur at the system level or the account level. The metrics tracked may relate to data quality, data timeliness, data size and/or other considerations. Data processing, including metrics tracking and data validation, are discussed in more detail above with reference to FIG. 1.

At block 206, the information management system 110 stores the processed data in the master data store 122. In some embodiments, the information management system may first store the data in a local cache, such as processed data store 118. The information management system may then send the data to the master data system 120 for storage in master data store 122. In other embodiments, the information management system 110 may directly access the master data store 122 in order to store the processed data. In some embodiments, storing the data in master data store may include matching data records of the processed data with previously stored data records in master data store 122. For example, information uniquely identifying an individual, business or other entity may be used by the information management system to match new records for a given individual or business with previously stored data for that individual or business. In other embodiments, the information management system may send the processed data to be stored in master data store 122 without comparison to the previously stored master data. In such embodiments, record matching and/or similar operations may be implemented by a system other than the information management system, such as by one or more modules implemented by master data system 120.

At block 208, the information management system stores the data validation and/or metric tracking information associated with the data processing. The data validation information and metric tracking information may be stored, for example, in metrics data store 116. While block 208 is illustrated as implemented after the data is stored in master data store 122, in some embodiments, the data validation and/or metric tracking information may be stored prior to data being stored in master data store 122. For example, as discussed above, the information management system may determine that certain received data does not meet certain quality threshold standards, such that the data is not processed but may still result in storage of data validation information indicating the problems. As another example, a large data set received from a given data supplier may be processed as a number of different transactions, where data of the individual transactions may be processed and stored in processed data store 118 (along with relevant tracking data stored in metrics data store 116) prior to master data store 122 being updated.

At block 210, the information management system may, in certain embodiments, generate an electronic alert or notification based on the data validation and/or metric tracking information. For example, the information management system may generate an alert if it determines that the data received from a given data supplier is not in an accepted quality range. As another example, an alert may be generated if data expected from a certain data supplier is not received in accordance with an expected schedule. Each of these alert types is discussed in more detail above with reference to FIG. 1. An alert or notification generated by the information management system may be delivered to an operator of the information management system and/or to the relevant data supplier. The alert may be delivered in any of a variety of ways, including email, text message, phone call, a generated user interface presented in association with a user's account with the credit bureau or other operator of the information management system, and so forth. In some embodiments, the form in which the alert is delivered and/or the recipient of the alert may be determined by the information management system based on the type and extent of the underlying problem or issue that triggered the alert. Once any generated alert is delivered, the illustrative method of FIG. 2 ends. In some embodiments, the information management system may generate an alert as soon as the trigger event is detected, such as, for example, after the data is received in block 202 or after some or all of the data is processed in block 204.

Figure 3:
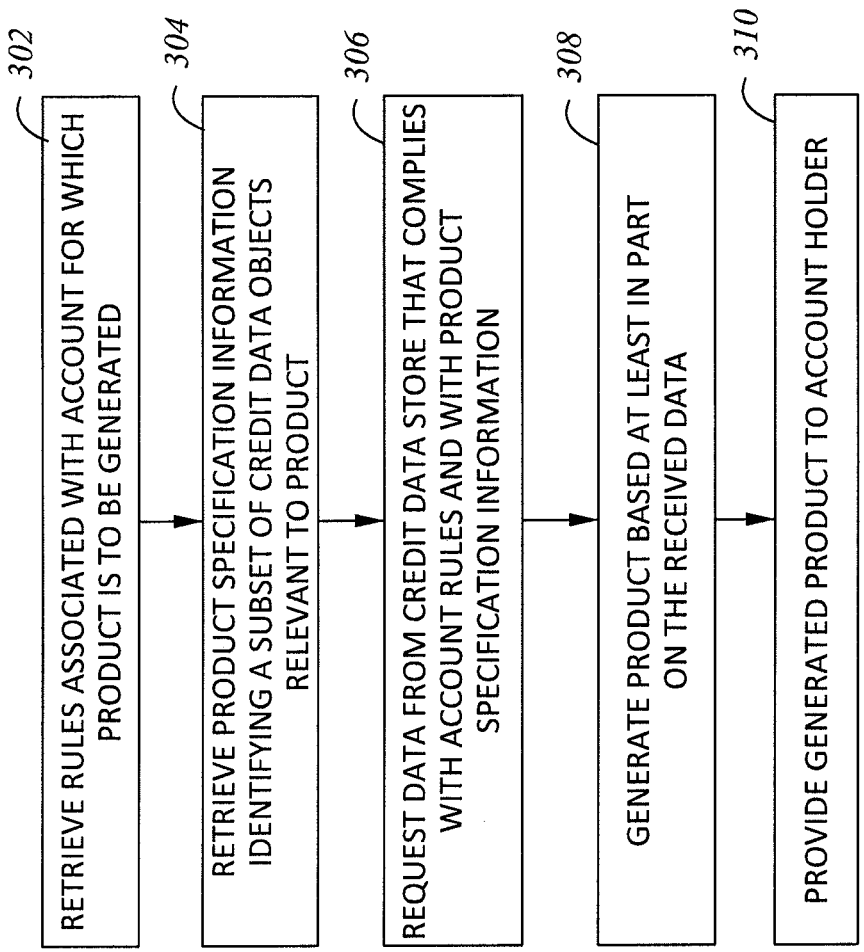
FIG. 3 is a flow chart illustrating one embodiment of a method for generating a product based at least in part on credit data.

FIG. 3 is a flow chart illustrating one embodiment of a method implemented by the product delivery system 130 for generating a product based on credit data and/or other data stored in master data store 122. The data types or data bands included in a given product and/or the formatting of the data to be presented in a given product may be previously stored in product data store 142, or may be selected by a user, such as a consumer, subscriber, account holder, financial institution, operator of the product delivery system, or other entity. For example, a user may be presented with one or more user interfaces generated by the product delivery system 130 that enable the user to select data fields, data bands or portions of data that the user would like included in a custom product, subject to constraints of rules data stored in rules data store 140. In some embodiments, the user interface provides the user with information on the pre-selected data fields, data bands, or portions of data that have already been selected based on regulatory constraints as well as the default selection based on user's account. The user interface may also indicate additional data fields, data bands or portions of data that the user can add to the product and/or pre-selected data fields, data bands, or portions of data that the user can remove from the custom product. Examples of predefined and/or customizable products may include, in some embodiments, consumer reports, commercial reports, public record reports, insurance reports, and/or some combination of elements typically included across different report types.

The illustrative method begins at block 302, where the product delivery system 130 retrieves rules associated with the account for which the product is to be generated. The rules may be retrieved, for example, from rules data store 140. Rules considered by the product delivery system in generating products may include, for example, an indication of which data types, data fields, and/or groups of data (also referred to as data bands) are available to potentially be accessed or included in a product, as well as what data types, data fields, and/or data bands are required based on regulatory or legal requirements. For example, a given country or region may require that a photograph of a property is included with any product that lists real estate information, while other regions may not have such a requirement, or may even prohibit inclusion of such photographs in certain types of credit products. Additional rules may be implemented at the account level, such as restrictions on the types of data that a given bank can select to include in products based on the types of data that the given bank chooses to share with the credit bureau or other operator of master data store 122.

At block 304, the product delivery system 130 retrieves product specification information identifying a subset of the credit data objects (such as by identifying specific groups of data or types of data) relevant to the product. For example, the product specification may define the data fields, data types or data bands to be retrieved from the master data store 122 and included in the generated product. In some situations, such as when a predefined product is being generated, the product specification information may be retrieved from product data store 142. In other instances, the product delivery system 130 may generate one or more user interfaces from which a user may select individual data fields or data bands. For example, the product delivery system 130 may determine a list of available data types, data fields or data bands based on the relevant regulatory rules, account-level rules and/or user-level rules. The product delivery system 130 may then display a list of these available data elements with selectable options for the user to select which data elements to include in the product. For example, a user interface may be presented with a selectable element for each available data type or data band that may be switched to an "on" or "off" state by the user to indicate whether the user desires to include the given data type in the product.

Once the product delivery system 130 has retrieved or received the product specification information, the illustrative method proceeds to block 306, where the product delivery system requests data from the credit data store that complies with the applicable rules and the product specification information. For example, if the product is a customized credit report for a given consumer, in which the product specification indicates that only certain selected data bands are desired by the requesting entity, the product delivery system may verify that the request complies with applicable regulatory rules, account-level rules and/or user-level rules, then send a request to the master data system 120 for the given consumer's data that falls into the selected data bands. In other embodiments, one or more rules may additionally or alternatively be maintained by the master data system 120 in order to ensure that data returned to the product delivery system in response to the request complies with the various legal and/or business requirements of the credit bureau or other operator of the master data system.

At block 308, the product delivery system 130 generates the product based at least in part on the received data. As one example, the product may be generated by arranging the received data in a report in accordance with the product specification information and a reporting format associated with the product and/or the account. In other embodiments, the product delivery system may perform additional data analysis with respect to the received data, such as by applying one or more formulas to determine additional data to include in the product or by generating a chart or graph associated with the data. The generated product may then be delivered to the account holder or related individual or entity that requested or subscribed to the product. As will be appreciated, the product may be provided in a variety of forms, including by email, by enabling a user to log in to a secure account using a username and password, via a web portal or other user interface, and/or mailed in printed form. Once the generated product is delivered or otherwise provided to the relevant entity, the illustrative method of FIG. 3 ends.

Bureau Orchestration Module

A bureau orchestration module or orchestration module may be operated, in certain embodiments, in association with an information management system, master data system, and/ or product delivery system, as disclosed herein. In other embodiments, the bureau orchestration module could operate as a separate computing system. The bureau orchestration module may enable an operator of administrative user to perform various actions related to a credit bureau or other information service. For example, a bureau orchestration module may implement methods related to on-boarding or setting up a data supplier, on-boarding or setting up a client or account holder, handling disputes, corrections to data, deletion of data, file splitting, tracking a file from arrival to data load, and so forth. In some embodiments, the authorized user (such as a bureau operator) may be required to login with a username and password to access the available features and perform operations. On successful login, a home page or other user interface may be displayed which provides features to the operator. For example, the operator may be able to access data tracking functionality and track one or more of the following: file arrival, data preparation data, preparation quality assurance (such as allowing the operator to pass or fail the validation results), data load, and/or data load quality assurance (such as allowing the operator to pass or fail the load results). The operator may also view metrics and samples for data validation and data load performed on a particular input file.

In some embodiments, the bureau orchestration module may provide bureau member management relative to a data supplier. For example, the bureau operator may on-board the data supplier and capture its details for storage in the system. Once the data supplier is on-boarded as a member, the bureau orchestration module may assign the member a unique bureau member identifier. In some embodiments, the data supplier may be on-boarded in the billing system first and then assigned. This information may then be sent to the master data system, where the system may accept the automated feed and assign the data supplier a unique bureau member identifier. The bureau orchestration module may allow the bureau operator to view the read-only profile of the data supplier and/or block the data supplier from further fulfillments, if needed or desired. Blocking fulfillments may include, for example, no longer accepting data from the data supplier (such as due to a legal concern or poor quality of the data) and/or no longer providing the data supplier with data in response to inquiries or product requests.

In some embodiments, the bureau orchestration module may also provide bureau member management relative to a product subscriber. For example, the bureau operator may on-board the product subscriber and capture its details for storage in the system. Once the product subscriber is on-boarded as a member, the bureau orchestration module may assign the member a unique bureau member identifier. In some embodiments, the product subscriber may be on-boarded in the billing system first and then assigned to one or more permissible products as discussed further below. This information may then be sent to the master data system, where the system may accept the automated feed and assign the product subscriber a unique bureau member identifier. The bureau orchestration module may allow the bureau operator to view the profile of the product subscriber and/or block the product subscriber from further fulfillments, if needed or desired.

In some embodiments, an entity may be only a data provider, only a product subscriber, or both a data provider and a product subscriber depending on the preferences of the entity and the regulations of region in which the entity practices.

The bureau orchestration module may, in some embodiments, allow the operator to request an administrative view of a report for a particular individual, business, or other entity and perform one or more operations on the report or data associated with the report. Some of the operations may include disputing an account or a data item, making corrections regarding data items, deleting data from a file, splitting a file (such as if the report contains mixed files), viewing system data, and/or viewing a disclosure report.

Example User Interfaces

FIGS. 4-19 are illustrative embodiments of user interfaces that may be generated and presented for display by a bureau orchestration module or other module described herein, as further described below.

Figure 4:
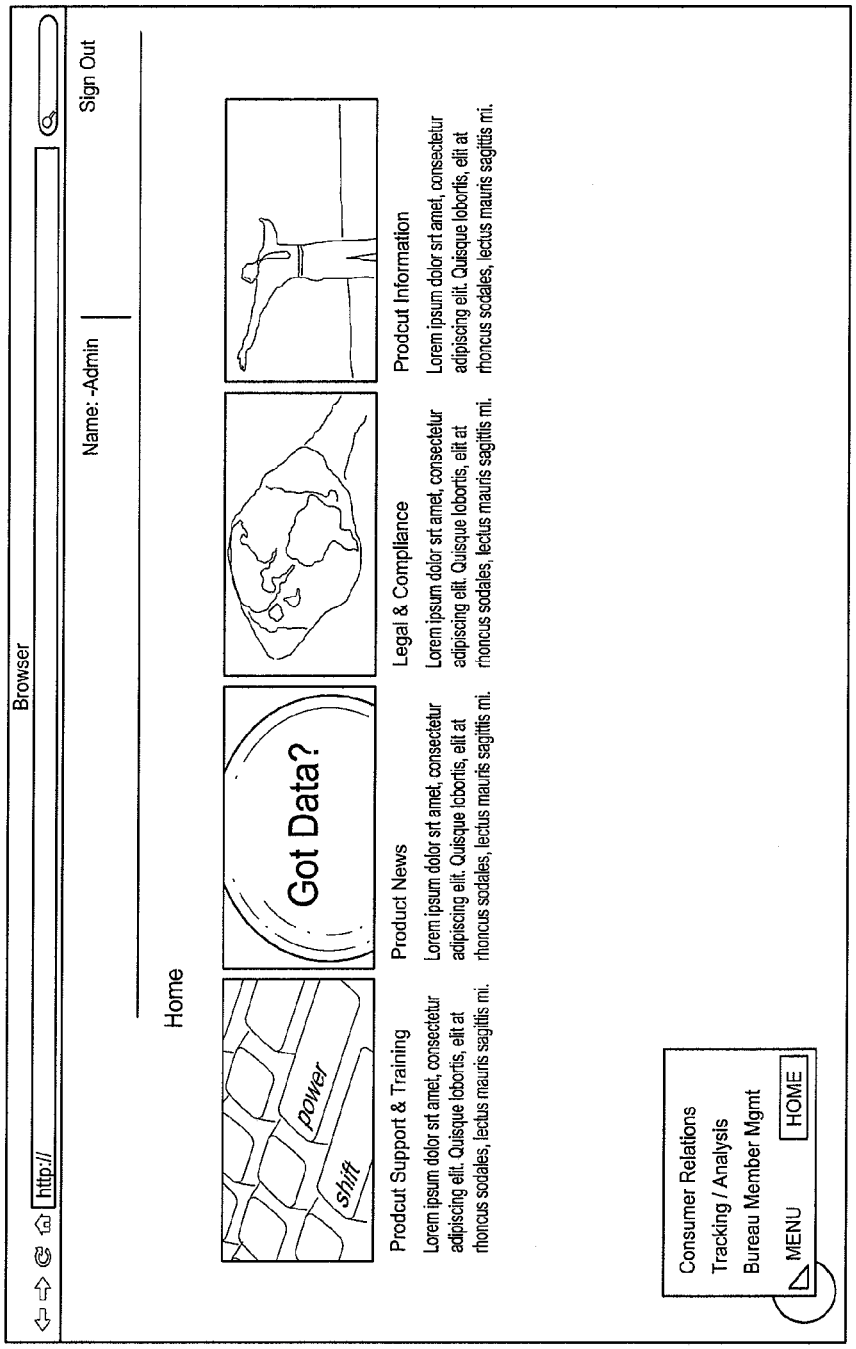

FIG. 4 is one embodiment of an illustrative user interface that may be presented as a home page or other user interface presented to a user upon login.

Figure 5:
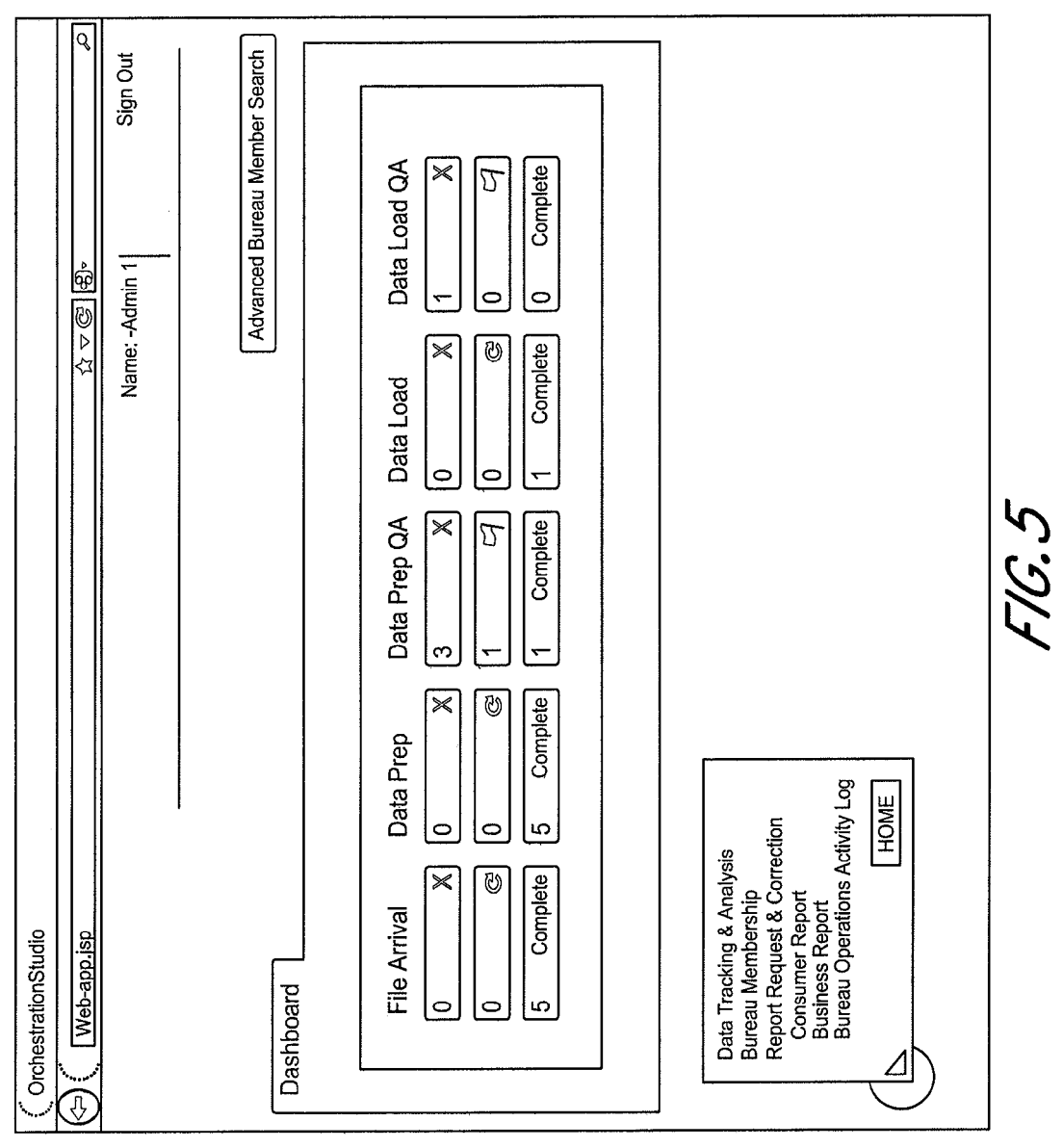

FIG. 5 is one embodiment of an illustrative user interface for data tracking that may provide the user with a holistic view of metrics or statistics of files that were submitted for one or more data load processes. The user interface includes expanded search options to search the files (such as by status) based on various criteria. The user interface includes a summary of the number of files successfully arrived, validated and loaded. A footer section provides menu options.

Figure 6:
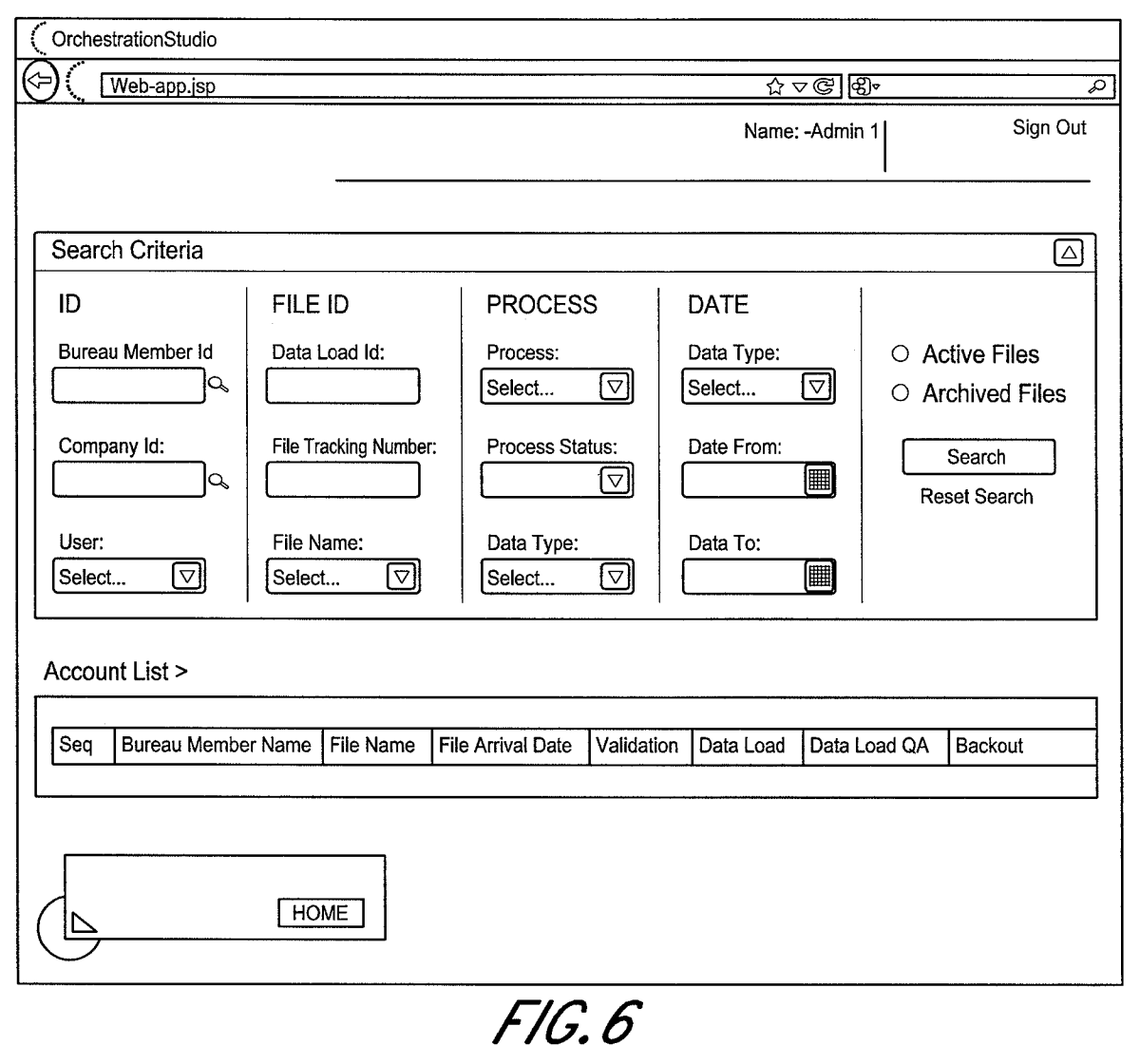

FIG. 6 is one embodiment of an illustrative user interface that provides an expanded search relative to data tracking, which may enable the bureau operator to search and/or track a file using multiple criteria. Some of the search criteria that a bureau operator can use are a bureau member identifier, company identifier, user identifier, file name, file tracking number, data type, process type, date range and/or process status. Upon a successful search, the results may be populated in the account list.

FIG. 7 is one embodiment of an illustrative user interface presenting data tracking results. The user interface displays all the files for the specified search parameter along with the file name and the name of the bureau member who submitted those files. The user interface displays different status notations for various steps from file arrival to data load. For example, an "X" may indicate the process failed. A looped arrow may indicate the loading is in process. A flag may indicate that manual intervention is needed, which may include a manual pass or fail quality assurance check. Selectable time and/or date options may be selected to view metrics available for the process.

FIG. 8 is one embodiment of an illustrative user interface for tracking metrics. In the illustrated embodiment, metrics may provide a count of all the conditions and rules that were triggered to complete the specific process. Once the validation or the data load step is complete, the module may generate a validation (or load) metric map detailing the quality of the file to be loaded. These metric results can also be exported to an easy to read format, such as a spreadsheet, which may then be sent out to data suppliers for data analysis and data quality improvements. As noted above, some parameters that may be tracked include total input records, total rejected records, total accepted records, total number of records with optional segment rejects, total records with account type cross field errors, total records with status cross field errors, and total records with date cross field errors.

FIGS. 9-10 are embodiments of illustrative user interfaces for data supplier on-boarding. In some embodiments, before a company or other data supplier starts sending data to the information management system, the company may be on-boarded as a data supplier. On-boarding a supplier may include assigning a bureau member identifier, creating a data supplier profile, requesting an FTP user name, password, inbox, and outbox for the data supplier (or other ways to exchange data with the system), setting management report settings, editing or deleting a profile, and so forth. In some embodiments, data supplier on-boarding may be a two step process, including (1) creating a member profile and capturing member identity and demographics information (illustrated in FIG. 9), and (2) creating a supplier's data type profile (illustrated in FIG. 10).

Figure 11:
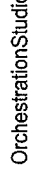

FIG. 11 is one embodiment of an illustrative user interface for on-boarding an entity that will be requesting or subscribing to products from the system. Once the product subscriber is on-boarded in the billing system, billing information may be used to create a bureau member identifier for the product subscriber and create a client read-only profile. As noted above, in some embodiments, a client of the system may be a data supplier, a product subscriber, or both.

Figure 12:

FIG. 12 is one embodiment of an illustrative user interface providing bureau member profile information, including client product permissions and settings. In the user interface, data items, data types, and or data bands can be assigned to the client and particular products, and account options can be selected.

Figure 13:
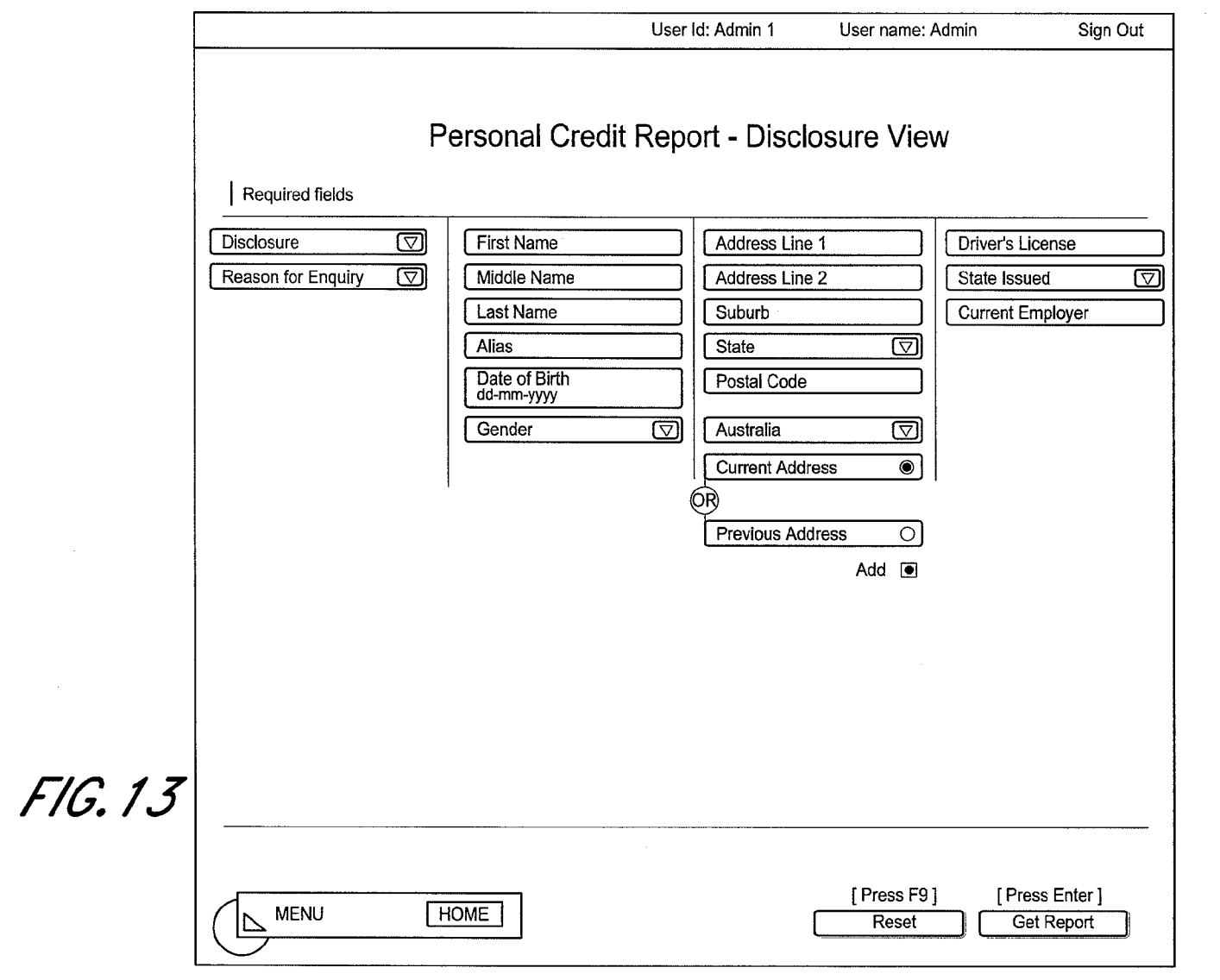

FIG. 13 is one embodiment of an illustrative user interface providing a request for a personal credit report, also referred to as an inquiry, by an operator. Once an inquiry is submitted, the module may validate the inquiry and generate an output response. If mandatory input criteria is not included, the module may return an input error response message. If no match is found, then the module may return a "no match found" report response. If a match is found, the module may generate a response report with available data. A similar user interface could be used to provide a request for a commercial credit report or a combined commercial and consumer credit report by an operator.

In other embodiments, the user interface for providing a request could also provide information on the default data or data bands to be included in the credit report. This default information may be tied to the default information stored in the account-related to the requesting client, individual, or entity. The user interface could also include options to add additional data or data bands to the credit report and/or to delete non-mandatory data or data bands in the default data or data bands.

The illustrative inquiry user interface may be provided as part of a set of consumer relations features available to an operator. Such consumer relations features may include accessing a disclosure report, accessing a client copy of a report, accessing an administrative copy of a report, flagging a disputed item on a report, updating a disputed item with outcome information, displaying dispute and dispute outcome information on a report, deleting incorrect information from a report, adding or deleting statements and/or alerts, correcting data items, maintaining customer notes, and/or file splitting.

FIG. 14 is one embodiment of an illustrative user interface for customer relations that provides the operator with modification options, if allowed. Modifications may include writing a statement to the account, logging a dispute, making corrections and/or deleting data.

Figure 15:
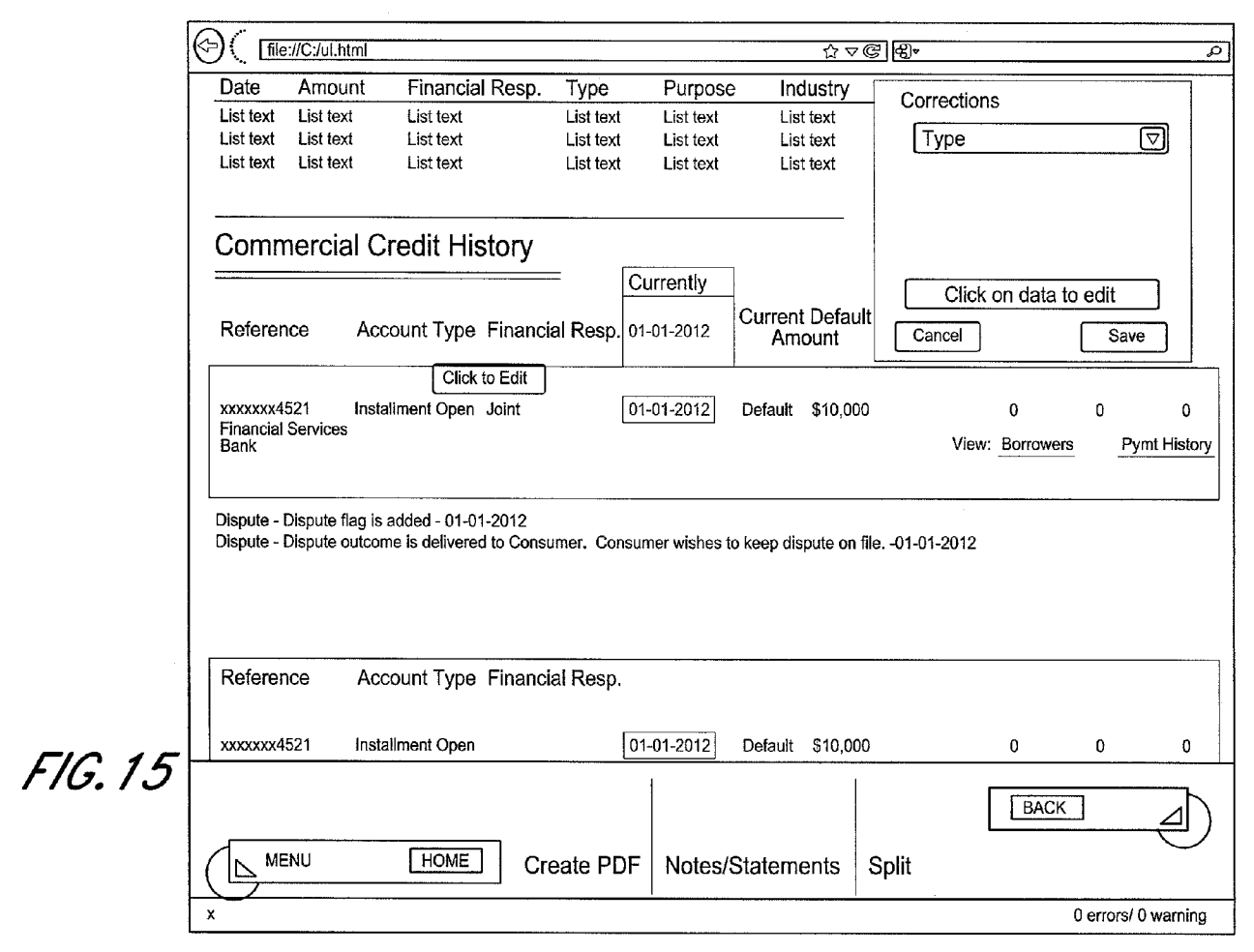

FIG. 15 is one embodiment of an illustrative user interface presented when the operator chooses to dispute information on a report. For example, the operator may select a "dispute" option. Once selected, the options may be displayed that enable the operator to dispute the received data, the reason and/or the text.

FIG. 16 is one embodiment of an illustrative user interface presented when the operator chooses to correct the information on a report. If the operator chooses to correct the information on the report, the operator may select the option to correct.

FIG. 17 is one embodiment of an illustrative user interface presented when the operator chooses to enter a statement on the account. It may enable the operator to capture one or more of: a statement received date, statement expiry date, statement type, statement contact number, and/or statement text.

FIG. 18 is one embodiment of an example of a personal credit report interface that enables an operator to view the system data for the data elements on the report, such as by hovering a cursor over the user interface. The system data may include the following: insert date, insert time, insert system code, insert user identifier, insert user identifier IP address, update date, update time, update system code, update user identifier, update user identifier IP address, database load identifier, soft delete code, soft delete date, data key (or keys), data type code, first reported date, last reported date, occurrence count, and bureau member identifier.

FIG. 19 is one embodiment of a user interface that enables an operator to split a file. The operator can choose to split a file, for example, if the report displays mixed files and contains information on two different entities on a single report. On selection of the split file option, the module may display a user interface with the accounts, inquiries and public records from the report lined up in the left column. The operator can move the accounts, inquiries and public records to another column, thus differentiating the information related to two entities. Once saved, the system may assign two new entity identifiers for the filtered information or assign a different existing identifier to one or more of the information items.

Example System Architecture

Figure 20:
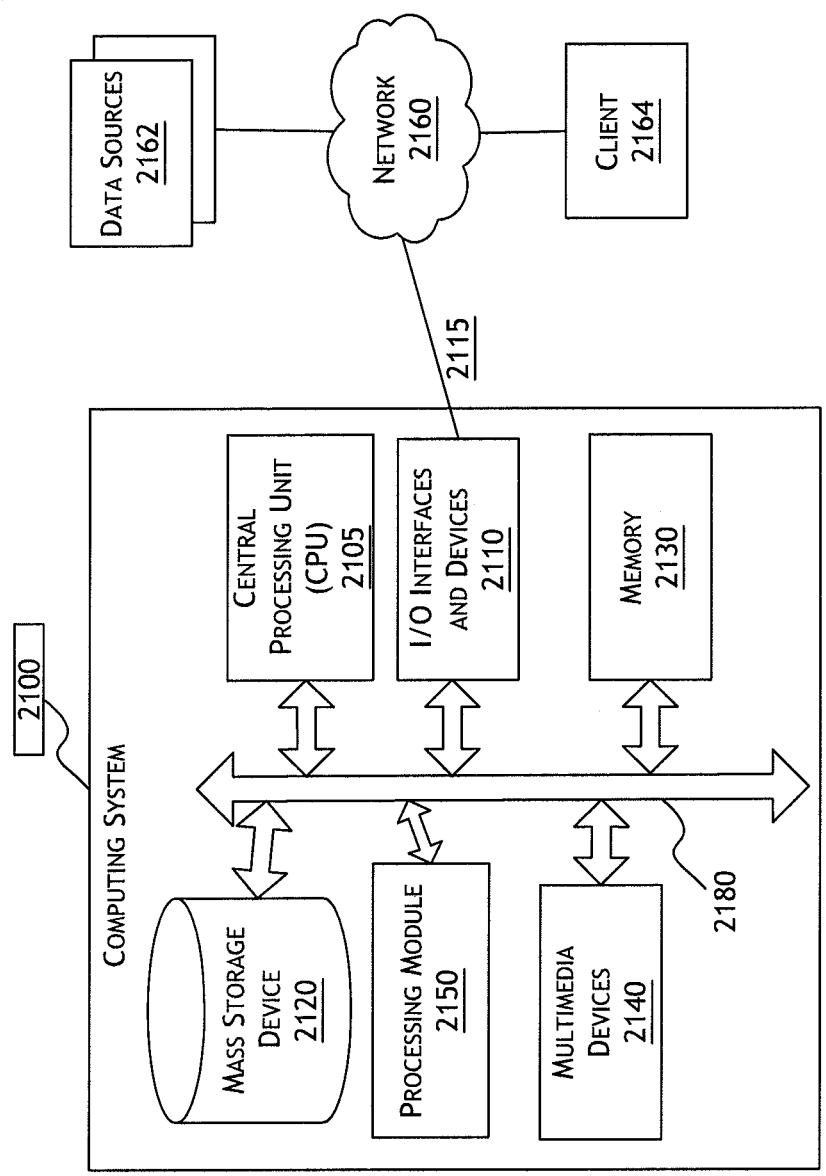
FIG. 20 illustrates one embodiment of a system for processing credit data and/or other data.

FIG. 20 is a block diagram showing an embodiment in which a computing system 2100 is in communication with one or more data sources 2162 and a client 2164 via a network 2160. The computing system 2100 may be used to implement systems and methods described herein, including, but not limited to, receiving data from one or more data sources, processing the data, generating products, and/or other features described herein. For example, each of the information management system 110, master data system 120 and/or product delivery system 130 may include components similar to those of system 2100 in FIG. 20, according to some embodiments.

The computing system 2100 includes, for example, a computer that may be IBM, Macintosh, or Linux/Unix compatible or a server or workstation. In one embodiment, the computing system 2100 comprises a server, desktop computer or laptop computer, for example. In one embodiment, the exemplary computing system 2100 includes one or more central processing units ("CPUs") 2105, which may each include a conventional or proprietary microprocessor. The computing system 2100 further includes one or more memory 2130, such as random access memory ("RAM") for temporary storage of information, one or more read only memory ("ROM") for permanent storage of information, and one or more mass storage device 2120, such as a hard drive, diskette, solid state drive, or optical media storage device. Typically, the modules of the computing system 2100 are connected to the computer using a standard based bus system 2180. In different embodiments, the standard based bus system could be implemented in Peripheral Component Interconnect ("PCP"), Microchannel, Small Computer System Interface ("SCSI"), Industrial Standard Architecture ("ISA") and Extended ISA ("EISA") architectures, for example. In addition, the functionality provided for in the components and modules of computing system 2100 may be combined into fewer components and modules or further separated into additional components and modules.

The computing system 2100 is generally controlled and coordinated by operating system software, such as Windows XP, Windows Vista, Windows 7, Windows Server, Unix, Linux, SunOS, Solaris, or other compatible operating systems. In Macintosh systems, the operating system may be any available operating system, such as MAC OS X. In other embodiments, the computing system 2100 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 2100 may include one or more commonly available input/output (I/O) devices and interfaces 2110, such as a keyboard, mouse, touchpad, and printer. In one embodiment, the I/O devices and interfaces 2110 include one or more display devices, such as a monitor, that allows the visual presentation of data to a user. More particularly, a display device provides for the presentation of GUIs, application software data, and multimedia presentations, for example. The computing system 2100 may also include one or more multimedia devices 2140, such as speakers, video cards, graphics accelerators, and microphones, for example.

In the embodiment of FIG. 20, the I/O devices and interfaces 2110 provide a communication interface to various external devices. In the embodiment of FIG. 20, the computing system 2100 is electronically coupled to a network 2160, which comprises one or more of a LAN, WAN, and/or the Internet, for example, via a wired, wireless, or combination of wired and wireless, communication link 2115. The network 2160 communicates with various computing devices and/or other electronic devices via wired or wireless communication links.

According to FIG. 20, information is provided to the computing system 2100 over the network 2160 from one or more data sources including, for example, data sources 2162. The information supplied by the various data sources may include, for example, trade data and other credit data, personal data, public record data, social network data, and so forth. In addition to the devices that are illustrated in FIG. 20, the network 2160 may communicate with other data sources or other computing devices. In addition, the data sources may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, a record-based database, and/or an unstructured database.

A client system 2164 may be connected to the network 2160 and used by a user to send and receive information to and from the computing system 2100. The client system 2164 may be a desktop computer, a mobile computer, or any other mobile device such as a mobile phone, smart phone, tablet or other similar handheld computing devices. The client system 2164 and/or data sources 2162 may include the same or similar components to those discussed above with reference to the computing system 2100.

In the embodiment of FIG. 20, the computing system 2100 also includes a processing module 2150 that may be stored in the mass storage device 2120 as executable software codes that are executed by the CPU 2105. This module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 20, the computing system 2100 is configured to execute the processing module 2150 in order to implement functionality described elsewhere herein. For example, the processing module may perform methods described with reference to any of various modules described above with reference to the information management system 110, master data system 120, bureau orchestration module, and/or product delivery system 130, depending on the embodiment.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 2100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In some embodiments, one or more computing systems, data stores and/or modules described herein may be implemented using one or more open source projects or other existing platforms. For example, one or more computing systems, data stores and/or modules described herein may be implemented in part by leveraging technology associated with one or more of the following: Drools, Hibernate, JBoss, Kettle, Spring Framework, NoSQL (such as the database software implemented by MongoDB) and/or DB2 database software.

Other Embodiments

Although the foregoing systems and methods have been described in terms of certain embodiments, other embodiments will be apparent to those of ordinary skill in the art from the disclosure herein. Additionally, other combinations, omissions, substitutions and modifications will be apparent to the skilled artisan in view of the disclosure herein. While some embodiments of the inventions have been described, these embodiments have been presented by way of example only, and are not intended to limit the scope of the inventions. Indeed, the novel methods and systems described herein may be embodied in a variety of other forms without departing from the spirit thereof. Further, the disclosure herein of any particular feature, aspect, method, property, characteristic, quality, attribute, element, or the like in connection with an embodiment can be used in all other embodiments set forth herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

What is claimed is:

1. A credit reporting system comprising:
    an information management system configured to process a plurality of large data sets comprising:
        an interface module configured to periodically receive a plurality of large data sets including trade data from each of a plurality of data providers;
        a memory configured to store large processed data sets and metrics regarding the large processed data sets;
        a data processing module configured to automatically process the received plurality of large data sets in parallel and to store the processed data sets in the memory, the processing including validating the trade data, tracking metric data about the processing of the plurality of large data sets, and storing the metric data in the memory; and
        an account module configured to:
            store account-specific criteria regarding the processing of the plurality of large data sets, wherein each of the account-specific criteria is associated with an account of a specific data provider of the plurality of data providers;
            automatically determine whether one of the account-specific criteria has been met with respect to data received from the associated data provider, wherein the determination of whether one of the account-specific criteria has been met is based at least in part on at least a portion of the metric data; and
            based at least in part on the determination of whether one of the account-specific criteria has been met, automatically generate an electronic notification to be provided to the associated data provider, wherein the notification includes an indication of whether one of the account-specific criteria has been met; and
    a credit reporting database configured to communicate with the information management system, to receive the processed plurality of large data sets from the information management system, and to store the processed plurality of large data sets as a set of data objects in the credit reporting database.

2. The credit reporting system of claim 1 wherein the processing of the data processing module further comprises removing duplicate data, parsing the data, and reformatting the data.

3. The credit reporting system of claim 1, wherein the plurality of large set of data include at least one of credit data, insurance data, credit card data, banking data, network data, utility data, public agency data, or business data.

4. The credit reporting system of claim 1 wherein the large processed data sets includes millions of records.

5. A computer-implemented credit data reporting method comprising:
    receiving, by a computer processor, a plurality of large data sets from each of a plurality of data providers, the plurality of large data sets including trade data, each of the plurality of large data sets including millions of records;
    automatically processing the received plurality of large data sets in parallel, the processing comprising:
        validating the trade data;
        tracking metric data about the processing of the plurality of large data sets; and
        storing the metric data in a memory; and
    storing the processed data sets in the memory;
    receiving an electronic representation of account-specific criteria regarding the processing of the plurality of large data sets, wherein the account-specific criteria is associated with a first account of a specific data provider of the plurality of data providers;
    storing the electronic representation of account-specific criteria;
    automatically, by a computer processor, determining whether one of the account-specific criteria has been met with respect to data received from the specific data provider, wherein the determination of whether one of the account-specific criteria has been met is based at least in part on at least a portion of the metric data; and
    based at least in part on the determination of whether one of the account-specific criteria has been met, automatically generating an electronic notification to be provided to the specific data provider, wherein the notification includes an indication of whether one of the account-specific criteria has been met.

6. The computer-implemented credit data reporting method of claim 5 further comprising automatically determining a recipient corresponding to the first account, automatically determining a preferred method of notification corresponding to the recipient, and automatically sending the electronic notification to the recipient using the preferred method of notification.

7. The computer-implemented credit data reporting method of claim 5 further comprising removing duplicates from each of the plurality of large data sets.

8. The computer-implemented credit data reporting method of claim 5, wherein the account-specific criteria are based at least in part on at least one of: total input records, total rejected records, or total accepted records.

9. The computer-implemented credit data reporting method of claim 5, wherein the account-specific criteria are based at least in part on at least one of: total input records, total rejected records, total accepted records, total number of records with optional segment rejects, total records with account type cross field errors, total records with status cross field errors, or total records with date cross field errors.

10. The computer-implemented credit data reporting method of claim 5 wherein the metric data includes conditions and rules which were triggered during the automatic processing of the received plurality of large data sets in parallel.

11. The computer-implemented credit data reporting method of claim 5, wherein the plurality of large set of data include at least one of credit data, insurance data, credit card data, banking data, social network data, utility data, public agency data, or business data.

12. A storage medium having a computer program stored thereon for causing a suitably programmed system to process computer-program code by performing the computer implemented method of claim 5 when such program is executed on the system.

\* \* \* \* \*